(12) United States Patent
Yoshimura et al.

(10) Patent No.: US 11,063,730 B2
(45) Date of Patent: Jul. 13, 2021

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 3 days.

(21) Appl. No.: 16/607,413

(22) PCT Filed: Apr. 26, 2018

(86) PCT No.: PCT/JP2018/017006
§ 371 (c)(1),
(2) Date: Oct. 23, 2019

(87) PCT Pub. No.: WO2018/199240
PCT Pub. Date: Nov. 1, 2018

(65) Prior Publication Data
US 2020/0076559 A1    Mar. 5, 2020

(30) Foreign Application Priority Data

Apr. 26, 2017  (JP) .............................. JP2017-087101

(51) Int. Cl.
*H04L 5/00*     (2006.01)
*H04W 72/04*    (2009.01)

(52) U.S. Cl.
CPC ............ *H04L 5/0053* (2013.01); *H04L 5/001* (2013.01); *H04L 5/0048* (2013.01); *H04W 72/042* (2013.01); *H04W 72/0413* (2013.01)

(58) Field of Classification Search
CPC ..... H04L 5/0053; H04L 5/001; H04L 5/0048; H04W 72/0413; H04W 72/042
(Continued)

(56) References Cited

U.S. PATENT DOCUMENTS

2013/0039284 A1*  2/2013  Marinier ................. H04L 5/001
                                                                      370/329
2019/0103941 A1*  4/2019  Seo .......................... H04L 5/00
(Continued)

FOREIGN PATENT DOCUMENTS

KR      20080096358 A    10/2008

OTHER PUBLICATIONS

3GPP TSG RAN WG1 88bis R1-1705173 (Apr. 2017).*
(Continued)

*Primary Examiner* — William Nealon
(74) *Attorney, Agent, or Firm* — ScienBiziP, P.C.

(57) ABSTRACT

A terminal apparatus includes a receiver configured to monitor a PDCCH in a control resource set and a transmitter configured to transmit a PUSCH scheduled based on an uplink grant included in a DCI format transmitted in the PDCCH. The PDCCH includes one or more Control Channel Elements (CCEs). One of the one or more CCEs includes six Resource Element Groups (REGs). One of the REGs includes a PRB in an OFDM symbol. The one CCE includes one or more REG bundles non-continuously mapped in a frequency domain. One of the one or more REG bundles includes one or a plurality of the REGs. The number of the
(Continued)

(a) Localized mapping    (b) Distributed mapping    (c) Distributed mapping

REGs constituting the one REG bundle in the frequency domain is given per the number of OFDM symbols in the one CCE.

8 Claims, 13 Drawing Sheets

(58) Field of Classification Search
USPC .......................................................... 370/329
See application file for complete search history.

(56) References Cited

U.S. PATENT DOCUMENTS

2019/0387514 A1* 12/2019 Horiuchi ............. H04W 72/044
2020/0052846 A1* 2/2020 Takeda ................. H04L 5/0048

OTHER PUBLICATIONS

3GPP TSG RAN WG1 88bis R1-1705225 (Apr. 2017).*
3GPP TSG RAN WG1 88bis R1-1706318 (Apr. 2017).*
3GPP TSG RAN WG1 88bis R1-1705377 (Apr. 2017).*
3GPP TSG RAN WG1 88bis R1-1704615 (Apr. 2017).*
3GPP TSG RAN WG1 88bis R1-1704948 (Apr. 2017).*

NTT Docomo, "New SID Proposal: Study on New Radio Access Technology", 3GPP TSG RAN Meeting #71, RP-160671, Mar. 7-10, 2016, 8 pages.
Panasonic; "The relation among RS, REG, CCE and CORSET"; 3GPP TSG RAN WG1 Meeting #88bis; R1-1705173; Apr. 3-7, 2017; pp. 1-4.
Ericsson, et al.; "WF on REG to CCE Mapping for NR-PDCCH"; 3GPP TSG RAN1 Meeting #88bis; R1-1706318; Apr. 3-7, 2017; 3 pages.
NTT Docomo et al, "Views on NR-PDCCH structure", vol. RAN WG1, No. Athens, Greece;3GPP Draft; R1-1702808, Mobile Competence Centre ; 650, Route Des Lucioles ; F-06921 Sophia-Antipolis Cedex ; France, (Feb. 7, 2017), XP051221635 * Section 2 *.
Guangdong Oppo Mobile Telecom, "Downlink control channel design consideration", vol. RAN WG1, No. Reno, USA; 3GPP Draft; R1-1611704, Mobile Competence Centre ; 650, Route Des Lucioles ; F-06921 Sophia-Antipolis Cedex ; France, (Nov. 4, 2016), XP051189140 * Section 2.2 *.
ZTE et al, "NR DL Control Channel Structure", vol. RAN WG1, No. Athens, Greece; R1-1701585, NR DL Control Channel Structure, (3GPP), Mobile Competence Centre ; 650, Route Des Lucioles ; F-06921 Sophia-Antipolis Cedex ; France, URL: (Feb. 7, 2017), XP051220804 * Sections 2-3 *.

* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-087101 filed on Apr. 26, 2017, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as User Equipment (UE). LTE is a cellular communication system in which multiple areas are deployed in a cellular structure, with each of the multiple areas being covered by the base station apparatus. A single base station apparatus may manage a plurality of cells.

In the 3GPP, for proposal to International Mobile Telecommunication (IMT)-2020, which is a standard for next-generation mobile communication system developed by the International Telecommunications Union (ITU), a next-generation standard (New Radio (NR)) has been studied (NPL 1). The NR has been requested to meet requirements assuming three scenarios: enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.

SUMMARY OF INVENTION

Technical Problem

One aspect of the present invention provides a terminal apparatus capable of efficiently performing downlink reception, a communication method used for the terminal apparatus, a base station apparatus capable of efficiently performing downlink transmission, and a communication method used for the base station apparatus.

Solution to Problem (1) A first aspect of the present invention is a terminal apparatus that includes a receiver configured to monitor a PDCCH in a control resource set, and a transmitter configured to transmit a PUSCH scheduled based on an uplink grant included in a DCI format transmitted in the PDCCH. The PDCCH includes one or more Control Channel Elements (CCEs). One of the one or more CCEs includes six Resource Element Groups (REGs). One of the REGs includes a PRB in an OFDM symbol. The one CCE includes one or more REG bundles non-continuously mapped in a frequency domain. One of the one or more REG bundles includes one or a plurality of the REGs. The number of the REGs constituting the one REG bundle in the frequency domain is given per the number of OFDM symbols in the CCE.

(2) A second aspect of the present invention is a base station apparatus that includes a transmitter configured to transmit a PDCCH in a control resource set, and a receiver configured to receive a PUSCH scheduled based on an uplink grant included in a DCI format transmitted in the PDCCH. The PDCCH includes one or more Control Channel Elements (CCEs). One of the one or more CCEs includes six Resource Element Groups (REGs). One of the REGs includes a PRB in an OFDM symbol. The one CCE includes one or more REG bundles non-continuously mapped in a frequency domain. One of the one or more REG bundles includes one or a plurality of the REGs. The number of the REGs constituting the one REG bundle in the frequency domain is given per the number of OFDM symbols in the CCE.

(3) A third aspect of the present invention is a communication method used for a terminal apparatus, the communication method including the steps of: monitoring a PDCCH in a control resource set; and transmitting a PUSCH scheduled based on an uplink grant included in a DCI format transmitted in the PDCCH. The PDCCH includes one or more Control Channel Elements (CCEs). One of the one or more CCEs includes six Resource Element Groups (REGs). One of the REGs includes a PRB in an OFDM symbol. The one CCE includes one or more REG bundles non-continuously mapped in a frequency domain. One of the one or more REG bundles includes one or a plurality of the REGs. The number of the REGs constituting the one REG bundle in the frequency domain is given per the number of OFDM symbols in the CCE.

(4) A fourth aspect of the present invention is a communication method used for a base station apparatus, the communication method including the steps of: transmitting a PDCCH in a control resource set; and receiving a PUSCH scheduled based on an uplink grant included in a DCI format transmitted in the PDCCH. The PDCCH includes one or more Control Channel Elements (CCEs). One of the one or more CCEs includes six Resource Element Groups (REGs). One of the REGs includes a PRB in an OFDM symbol. The one CCE includes one or more REG bundles non-continuously mapped in a frequency domain. One of the one or more REG bundles includes one or a plurality of the REGs. The number of the REGs constituting the one REG bundle in the frequency domain is given per the number of OFDM symbols in the CCE.

Advantageous Effects of Invention

According to one aspect of the present invention, the terminal apparatus can efficiently perform downlink reception. In addition, the base station apparatus can efficiently perform downlink transmission.

DESCRIPTION OF EMBODIMENTS

Embodiments of the present invention will be described below.

Figure 1:
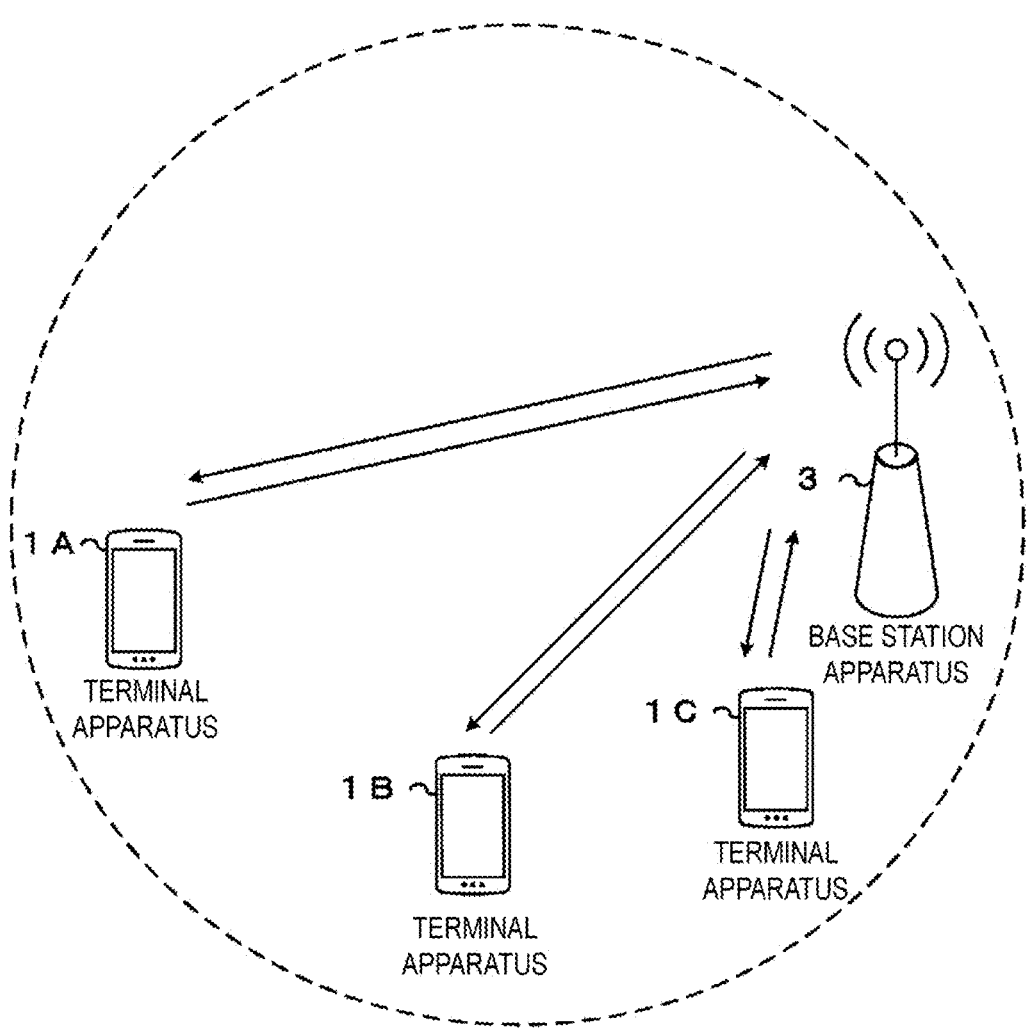
FIG. 1 is a conceptual diagram of a radio communication system according to one aspect of the present embodiment.

FIG. 1 is a conceptual diagram of a radio communication system according to one aspect of the present embodiment. In FIG. 1, the radio communication system includes terminal apparatuses 1A to 1C and a base station apparatus 3. Hereinafter, the terminal apparatuses 1A to 1C are also referred to as a terminal apparatus 1.

Hereinafter, various radio parameters related to communications between the terminal apparatus 1 and the base station apparatus 3 will be described. Here, at least some of the radio parameters (for example, Subcarrier Spacing (SCS)) are also referred to as Numerology. The radio parameters include at least some of the subcarrier spacing, a length of an OFDM symbol, a length of a subframe, a length of a slot, or a length of a minislot.

The subcarrier spacing may be classified into two: reference subcarrier spacing (Reference SCS, Reference Numerology) and subcarrier spacing (Actual SCS, Actual Numerology) for a communication method used for the actual wireless communications. The reference subcarrier spacing may be used to determine at least some of the radio parameters. For example, the reference subcarrier spacing is used to configure the length of the subframe. Here, the reference subcarrier spacing is, for example, 15 kHz.

The subcarrier spacing used for the actual wireless communications is one of the radio parameters for the communication method (for example, Orthogonal Frequency Division Multiplex (OFDM), Orthogonal Frequency Division Multiple Access (OFDMA), Single Carrier-Frequency Division Multiple Access (SCFDMA), Discrete Fourier Transform-spread-OFDM (DFT-s-OFDM) used for no communication between the terminal apparatus 1 and the base station apparatus 3. Hereinafter, the reference subcarrier spacing is also referred to as first subcarrier spacing. The subcarrier spacing used for the actual wireless communications is also referred to as second subcarrier spacing.

Figure 2:
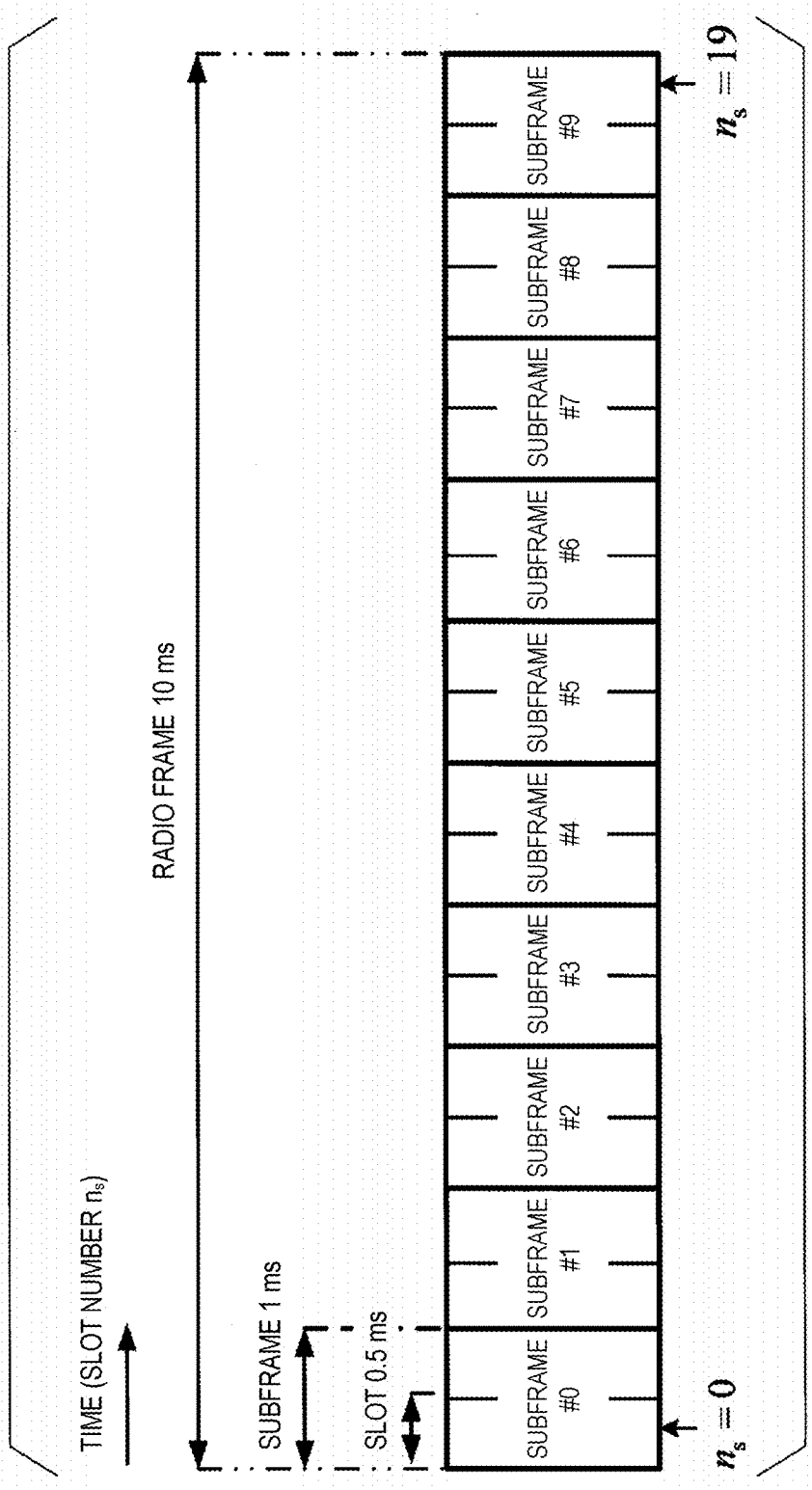
FIG. 2 is an example illustrating configurations of a radio frame, subframes, and slots according to the one aspect of the present embodiment.

FIG. 2 is an example illustrating configurations of a radio frame, subframes, and slots according to the one aspect of the present embodiment. In one example illustrated in FIG. 2, the length of the slot is 0.5 ms, the length of the subframe is 1 ms, and the length of the radio frame is 10 ms. The slot may be a unit for resource allocation in the time domain. For example, the slot may be a unit for mapping of one transport block. For example, the transport block may be mapped to one slot. Here, the transport block may be a unit of data to be transmitted in a predetermined interval (for example, Transmission Time Interval (TTI)) defined in a higher layer (for example, Medium Access Control (MAC)).

For example, the length of the slot may be given according to the number of OFDM symbols. For example, the number of OFDM symbols may be 7 or 14. The length of the slot may be given based on at least the length of the OFDM symbol. The length of the OFDM symbol may differ based on at least the second subcarrier spacing. The length of the OFDM symbol may be given based on at least the number of points of Fast Fourier Transform (FFT) used to generate the OFDM symbol. The length of the OFDM symbol may include a length of a Cyclic Prefix (CP) added to the OFDM symbol. Here, the OFDM symbol may be referred to as a symbol. In a case that a communication method other than OFDM is used in communications between the terminal apparatus 1 and the base station apparatus 3 (for example, in the use of SC-FDMA, DFT-s-OFDM, or the like), the generated SC-FDMA symbol and/or DFT-s-OFDM symbol is also referred to as an OFDM symbol. Here, for example, the length of the slot may be 0.25 ms, 0.5 ms, 1 ms, 2 ms, or 3 ms. Moreover, unless otherwise stated, OFDM includes SC-FDMA or DFT-s-OFDM.

The OFDM includes a multi-carrier communication method applying waveform shaping (Pulse Shape), PAPR reduction, out-of-band radiation reduction, or filtering, and/or phase processing (for example, phase rotation and the like). The multi-carrier communication method may be a communication method that generates/transmits a signal in which a plurality of subcarriers are multiplexed.

The length of the subframe may be 1 ms. The length of the subframe may be given based on the first subcarrier spacing. For example, with the first subcarrier spacing of 15 kHz, the length of the subframe may be 1 ms. The subframe may include one or more slots.

The radio frame may be given according to the number of subframes. The number of subframes for the radio frame may be, for example, 10.

Figure 3:
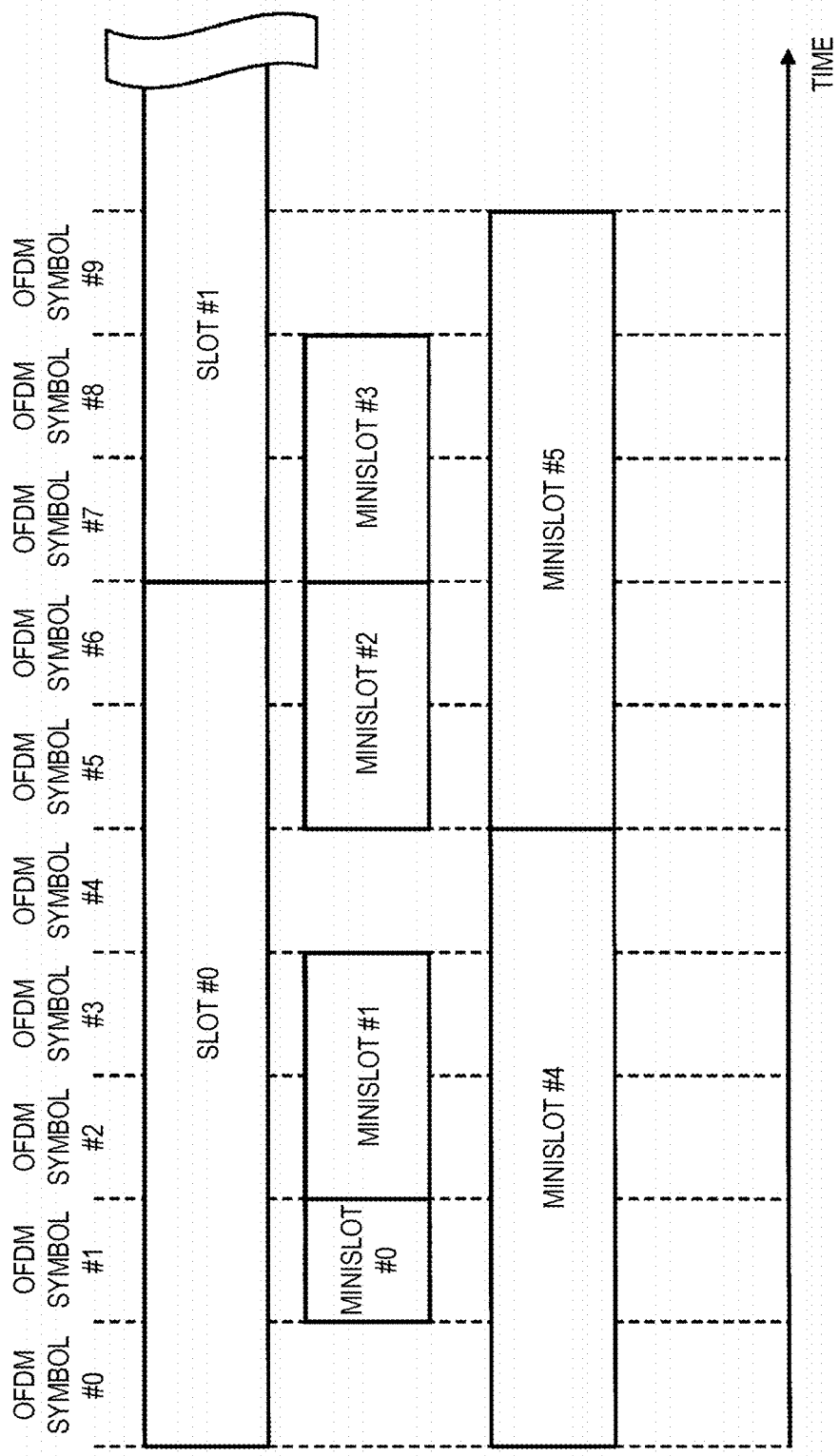
FIG. 3 is a diagram illustrating a configuration example of the slots and minislots according to the one aspect of the present embodiment.

FIG. 3 is a diagram illustrating a configuration example of the slots and minislots according to the one aspect of the present embodiment. In FIG. 3, the number of OFDM symbols constituting the slot is seven. The minislot may include OFDM symbols, the number of which is smaller than the number of OFDM symbols constituting the slot. The minislot may have a length shorter than that of the slot. FIG. 3 illustrates a minislot #0 to a minislot #5 as an example of the configuration of the minislots. As illustrated in the minislot #0, the minislot may include one OFDM symbol. Additionally, as illustrated in the minislots #1 to #3, the minislot may include two OFDM symbols. As illustrated in the minislot #1 and minislot #2, a gap may be inserted between the two minislots. As illustrated in the minislot #5, the minislot may be configured across a boundary between the slot #0 and the slot #1. That is, the minislot may be configured across the boundary of the slots. Here, the minislot is also referred to as a sub-slot. The minislot is also referred to as short Transmission Time Interval (short TTI (sTTI)). In the following, the slot may be replaced by the minislot. The minislots may include as many OFDM symbols as the slot. The minislot may include OFDMs, the number of which is larger than the number of OFDM symbols constituting the slot. The length of the minislot in the time domain may be shorter than that of the slot. The length of the minislot in the time domain may be shorter than that of one subframe (for example, 1 ms).

Physical channels and physical signals according to various aspects of the present embodiment will be described.

In FIG. 1, the following uplink physical channels are at least used for uplink radio communication from the terminal apparatus 1 to the base station apparatus 3. The uplink physical channels are used by a physical layer for transmission of information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes: Channel State Information (CSI) of a downlink channel; a Scheduling Request (SR) used to request a PUSCH (UpLink-Shared CHannel (UL-SCH)) resource for initial transmission; and Hybrid Automatic Repeat request ACKnowledgement (HARQ-ACK) to downlink data (Transport block (TB), Medium Access Control Protocol Data Unit (MAC PDU), Downlink-Shared Channel (DL-SCH), and Physical Downlink Shared Channel (PDSCH)). The HARQ-ACK indicates an acknowledgement (ACK) or a negative-acknowledgement (NACK). The HARQ-ACK is also referred to as a HARQ feedback, HARQ information, HARQ control information, and ACK/NACK.

The Channel State Information (CSI) at least includes Channel Quality Indicator (CQI) and Rank Indicator (RI). The Channel Quality Indicator may include a Precoder Matrix Indicator (PMI). The CQI is an indicator related to a channel quality (propagation intensity), and PMI is an indicator that indicates a precoder. The RI is an indication that indicates a transmission rank (or the number of transmission layers).

The PUSCH is used for transmission of uplink data (TB, MAC PDU, UL-SCH, and PUSCH). The PUSCH may be used to transmit the HARQ-ACK and/or the channel state information along with the uplink data. Furthermore, the PUSCH may be used to transmit only the channel state information or to transmit only the HARQ-ACK and the channel state information. The PUSCH is used to transmit a random access message 3.

The PRACH is used to transmit a random access preamble (random access message 1). The PRACH is used for indicating initial connection establishment procedure, handover procedure, connection re-establishment procedure, synchronization (timing adjustment) for uplink data transmission, and a request for a PUSCH (UL-SCH) resource. The random access preamble may be used to notify the base station apparatus 3 of an index (random access preamble index) given by the higher layer of the terminal apparatus 1.

The random access preamble may be given by cyclic shift of a Zadoff-Chu sequence corresponding to a physical root sequence index u. The Zadoff-Chu sequence may be generated based on the physical root sequence index u. In one cell, a plurality of random access preambles may be defined. The random access preamble may be identified based on at least the index of the random access preamble. Different random access preambles corresponding to different indexes of the random access preamble may correspond to different combinations of the physical root sequence indexes u and the cyclic shifts. The physical root sequence index u and the cyclic shift may be given based on at least information included in system information. The physical root sequence index u may be an index for identifying a sequence included in the random access preamble. The random access preamble may be identified based on at least the physical root sequence index u.

In FIG. 1, the following uplink physical signal is used for the uplink radio communication. The uplink physical signal need not be used for transmitting information output from the higher layer, but is used by the physical layer.

Uplink Reference Signal (UL RS)

In the present embodiment, at least the following two types of uplink reference signals may be at least used.

Demodulation Reference Signal (DMRS)
Sounding Reference Signal (SRS)

The DMRS is associated with transmission of PUSCH and/or PUCCH. The DMRS is multiplexed with the PUSCH or the PUCCH. The base station apparatus 3 uses the DMRS to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS need not be associated with the transmission of the PUSCH or the PUCCH. The base station apparatus 3 may use the SRS to measure the channel state. The SRS may be transmitted at the end of the subframe or the slot in an uplink slot or at an OFDM symbol of a predetermined number from the end.

In FIG. 1, the following downlink physical channels are used for downlink radio communication from the base station apparatus 3 to the terminal apparatus 1. The downlink physical channels are used by the physical layer for transmission of information output from the higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, a Broadcast Channel (BCH)) that is commonly used by the terminal apparatuses 1. The PBCH may be transmitted based on predetermined transmission interval. For example, the PBCH may be transmitted at 80 ms intervals. Contents of information included in the PBCH may be updated at every 80 ms. The PBCH may include 288 subcarriers. The PBCH may be configured to include two, three, or four OFDM symbols. The MIB may include information on an identifier (index) of a synchronization signal. The MIB may include information that indicates at least some of a number of the slot in which PBCH is transmitted, a number of the slot in which PBCH is transmitted, or a number of the radio frame in which PBCH is transmitted.

The PDCCH is used to transmit Downlink Control Information (DCI). The downlink control information is also referred to as a DCI format. The downlink control information may include at least either a downlink grant or an uplink grant. The downlink grant is also referred to as a downlink assignment or a downlink allocation.

One downlink grant is used at least for scheduling of a single PDSCH in a single serving cell. The downlink grant is used at least for the scheduling of the PDSCH in the same slot as the slot in which the downlink grant is transmitted.

One uplink grant is used at least for scheduling of a single PUSCH in a single serving cell.

In the terminal apparatus 1, one or more control resource sets are configured for searching for PDCCH. The terminal apparatus 1 attempts to receive the PDCCH in the configured control resource set. Details of the control resource set will be described later.

The PDSCH is used to transmit the downlink data (DL-SCH, PDSCH). The PDSCH is at least used to transmit a random access message 2 (random access response). The PDSCH is at least used to transmit the system information including parameters used for initial access.

In FIG. 1, the following downlink physical signals are used for the downlink radio communication. The downlink physical signal need not be used for transmitting the information output from the higher layer, but is used by the physical layer.

Synchronization signal (SS)
Downlink Reference Signal (DL RS)

The synchronization signal is used for the terminal apparatus 1 to establish synchronization in a frequency domain and a time domain in the downlink. The synchronization signal includes a Primary Synchronization Signal (PSS) and a Second Synchronization Signal (SSS).

The downlink reference signal is used for the terminal apparatus 1 to perform channel compensation on a downlink physical channel. The downlink reference signal is used for the terminal apparatus 1 to obtain the downlink channel state information.

According to the present embodiment, the following two types of downlink reference signals are used.

Demodulation Reference Signal (DMRS)
Shared Reference Signal (Shared RS)

The DMRS corresponds to the PDCCH and/or PDSCH transmission. The DMRS is multiplexed with the PDCCH or the PDSCH. The terminal apparatus 1 may use the DMRS, which corresponds to the PDCCH or the PDSCH, in order to perform the channel compensation of the PDCCH or the PDSCH. Hereinafter, the transmission of the PDCCH and the DMRS corresponding to the PDCCH together is simply referred to as transmission of the PDCCH. Hereinafter, the transmission of the PDSCH and the DMRS corresponding to the PDSCH together is simply referred to as transmission of the PDSCH.

The Shared RS may at least correspond to the transmission of PDCCH. The shared RS may be multiplexed with the PDCCH. The terminal apparatus 1 may use the Shared RS for the channel compensation of the PDCCH. Hereinafter, the transmission of the PDCCH and the Shared RS together is also simply referred to as transmission of the PDCCH.

The DMRS may be RS individually configured to the terminal apparatuses 1. The DMRS sequence may be given based on at least the parameter individually configured to the terminal apparatus 1. The DMRS may be individually transmitted for the PDCCH and/or the PDSCH. Meanwhile, the Shared RS may be RS commonly configured to a plurality of terminal apparatuses 1. The Shared RS sequence may be given regardless of the parameter individually configured to the terminal apparatus 1. For example, the Shared RS sequence may be given based on at least some of the slot number, the minislot number, or a cell ID (identity). The Shared RS may be RS transmitted regardless of whether the PDCCH and/or the PDSCH is transmitted.

The downlink physical channel and the downlink physical signal are also referred to as a downlink signal. The uplink physical channel and the uplink physical signal are also referred to as an uplink signal. The downlink physical channels and the uplink physical channels are collectively referred to as a physical channel. The downlink physical signals and the uplink physical signals are collectively referred to as a physical signal.

The BCH, the UL-SCH, and the DL-SCH are transport channels. A channel used in a Medium Access Control (MAC) layer is referred to as a transport channel. A unit of the transport channel used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive RRC signaling (also referred to as a Radio Resource Control message (RRC message) or Radio Resource Control information (RRC information)) in a Radio Resource Control (RRC) layer. Furthermore, the base station apparatus 3 and the terminal apparatus 1 may transmit and/or receive a MAC Control Element (CE) in the MAC layer. Here, the RRC signaling and/or the MAC CE is also referred to as higher layer signaling.

The PUSCH and the PDSCH are at least used to transmit the RRC signaling and the MAC CE. Here, the RRC signaling transmitted from the base station apparatus 3 through the PDSCH may be signaling common to the plurality of terminal apparatuses 1 in a cell. The signaling common to the plurality of terminal apparatuses 1 in the cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A cell-specific parameter may be transmitted by using the signaling common to the plurality of terminal apparatuses 1 in the cell or the signaling dedicated to the certain terminal apparatus 1. A UE-specific parameter may be transmitted by using the signaling dedicated to the certain terminal apparatus 1. The PDSCH including the dedicated RRC signaling may be scheduled by the PDCCH in a first control resource set.

Broadcast Control Channel (BCCH), Common Control Channel (CCCH), and Dedicated Control Channel (DCCH) are logical channels. For example, the BCCH is a higher layer channel used to transmit the MIB. The Common Control Channel (CCCH) is a higher layer channel used to transmit information common to the plurality of terminal apparatuses 1. Here, the CCCH is used for the terminal apparatus 1 in a state other than RRC Connection, for example. The Dedicated Control Channel (DCCH) is a higher layer channel used to transmit individual control information (dedicated control information) to the terminal apparatus 1. Here, the DCCH is used for the terminal apparatus 1 in a state of RRC Connection, for example.

The BCCH in the logical channel may be mapped to the BCH, DL-SCH, or UL-SCH in the transport channel. The CCCH in the logical channel may be mapped to the DL-SCH or UL-SCH in the transport channel. The DCCH in the logical channel may be mapped to the DL-SCH or UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

Hereinafter, the control resource set will be described.

Figure 4:
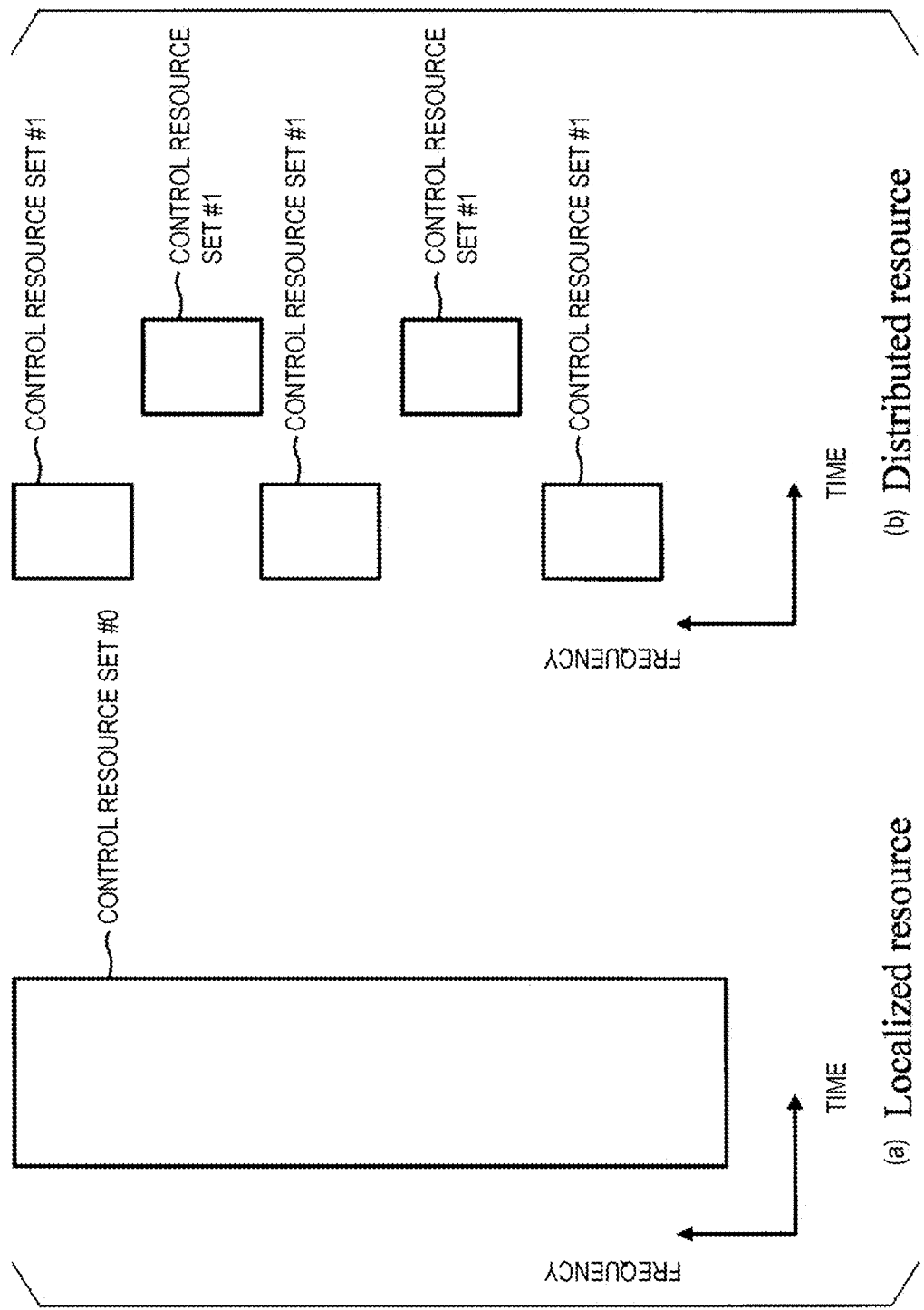
FIG. 4 is a diagram illustrating an example of mapping control resource sets according to the one aspect of the present embodiment.

FIGS. 4A and 4B are diagrams, each illustrating an example of mapping control resource sets according to the one aspect of the present embodiment. The control resource set may indicate a time frequency domain in which one or more control channels can be mapped. The control resource set may be a region in which the terminal apparatus 1 attempts to receive the PDCCH. As illustrated in FIG. 4(a), the control resource set may include a continuous resource (Localized resource). As illustrated in FIG. 4(b), the control resource set may include non-continuous resources (distributed resources).

In the frequency domain, the unit of mapping the control resource sets may be a resource block. In the time domain, the unit of mapping the control resource sets may be the OFDM symbol.

The frequency domain of the control resource set may be the same as a system bandwidth of the serving cell. The frequency domain of the control resource set may be given based on at least the system bandwidth of the serving cell. The frequency domain of the control resource set may be given based on at least the signaling of the higher layer and/the downlink control information.

The time domain of the control resource set may be given based on at least the signaling of the higher layer and/or the downlink control information.

The control resource set may include at least one or both of a Common control resource set and a Dedicated control resource set. The common control resource set may be a control resource set commonly configured to the plurality of terminal apparatuses 1. The common control resource set may be given based on at least the MIB, the first system information, the system information, the common RRC signaling, the cell ID, and the like. The dedicated control resource set may be a control resource set configured to be dedicatedly used for the terminal apparatus 1. The dedicated control resource set may be given based on at least the dedicated RRC signaling and/or a value of C-RNTI.

The control resource set may be a set of control channels (or control channel candidates) monitored by the terminal apparatus 1. The control resource set may include a set of control channels (or control channel candidates) monitored by the terminal apparatus 1. The control resource set may be configured to include one or more Search Spaces (SS). The control resource set may be the search space.

The search space includes one or more PDCCH candidates. The terminal apparatus 1 receives the PDCCH candidate included in the search space and attempts to receive the PDCCH. Here, the PDCCH candidate is also referred to as a blind detection candidate.

The search space may include at least one or both of Common Search Space (CSS) and UE-specific Search Space (USS). The CSS may be a search space configured to be common to the plurality of terminal apparatuses 1. The USS may be a search space including a configuration dedicatedly used for the terminal apparatus 1. The CSS may be given based on at least the MIB, the first system information, the system information, the common RRC signaling, the cell ID, and the like. The USS may be given based on at least the dedicated RRC signaling and/or a value of C-RNTI.

The common control resource set may include at least one or both of the CSS and the USS. The dedicated control resource set may include at least one or both of the CSS and the USS. The dedicated control resource set need not include the CSS.

The physical resource of the search space includes a Control Channel Element (CCE). The CCE includes a predetermined number of Resource Element Groups (REGs). For example, the CCE may include six REGs. The REG may include one OFDM symbol in one Physical Resource Block (PRB). That is, the REG may include 12 Resource Elements (REs). The PRB is also simply referred to as a Resource Block (RB).

The unit of the physical resource according to the present embodiment will be described below.

Figure 5:
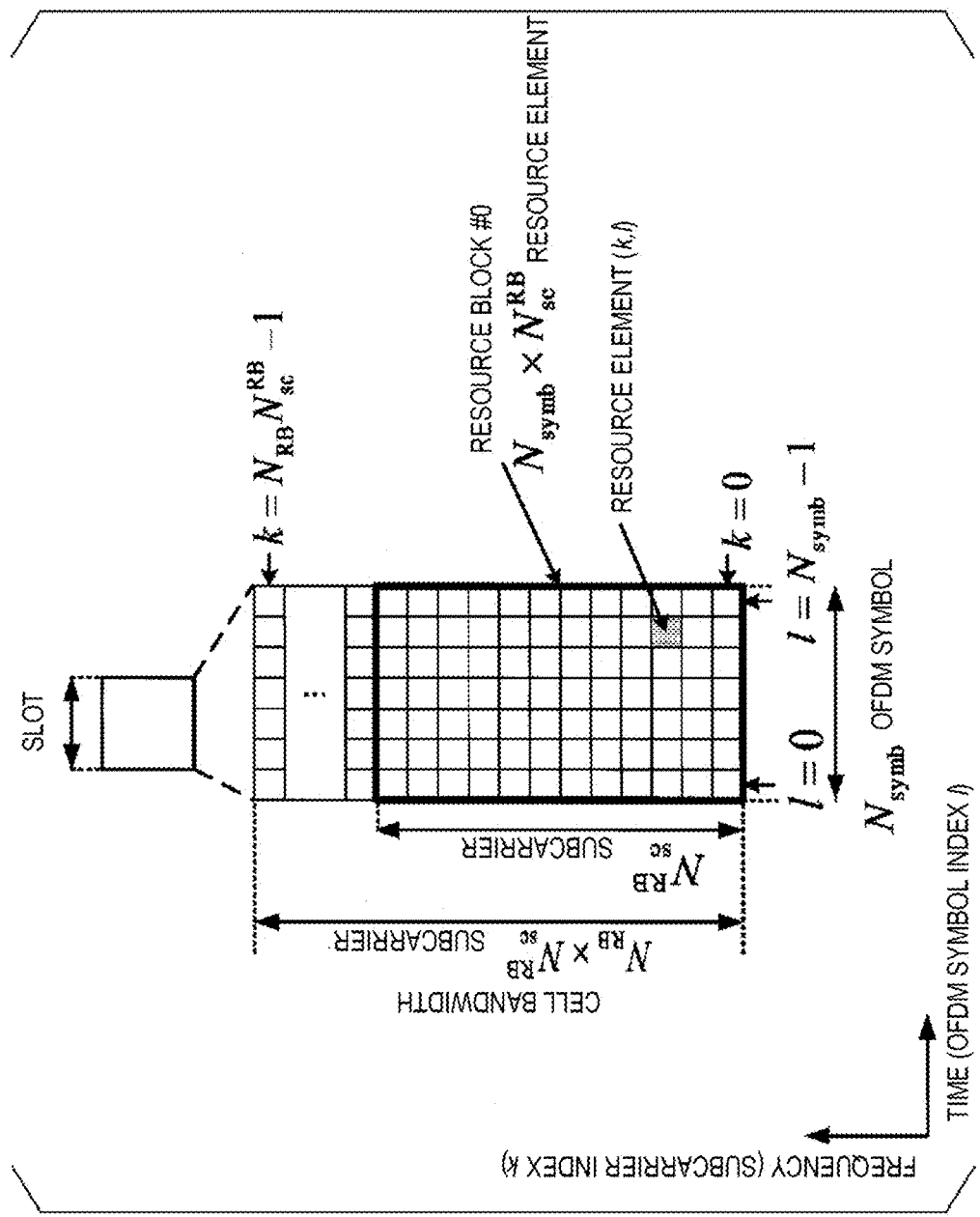
FIG. 5 is a diagram illustrating an example of resource elements included in the slot according to the one aspect of the present embodiment.

FIG. 5 is a diagram illustrating an example of resource elements included in the slot according to the one aspect of the present embodiment. Here, the resource element is a resource defined by one OFDM symbol and one subcarrier. As illustrated in FIG. 5, the slot includes $N_{symb}$ pieces of OFDM symbols. The number of subcarriers included in the slot may be given by a product of the number of resource blocks $N_{RB}$ included in the slot and the number of subcarriers per resource block $N^{RB}_{SC}$. Here, the resource block is a group of the resource elements in the time domain and the frequency domain. The resource block may be used as a unit of resource allocation in the time domain and/or the frequency domain. For example, the $N^{RB}_{SC}$ may be 12. The $N_{symb}$ may be the same as the number of OFDM symbols included in the subframe. The $N_{symb}$ may be the same as the number of OFDM symbols included in the slot. $N_{RB}$ may be given based on a bandwidth of a cell and the first subcarrier spacing. The $N_{RB}$ may also be given based on the bandwidth of the cell and the second subcarrier spacing. The $N_{RB}$ may be given based on higher layer signaling (for example, RRC signaling) transmitted from the base station apparatus 3, and the like. Additionally, the $N_{RB}$ may be given based on the description in the specifications, and the like. The resource element is identified by an index k for the subcarrier and an index 1 for the OFDM symbol.

Figure 6:
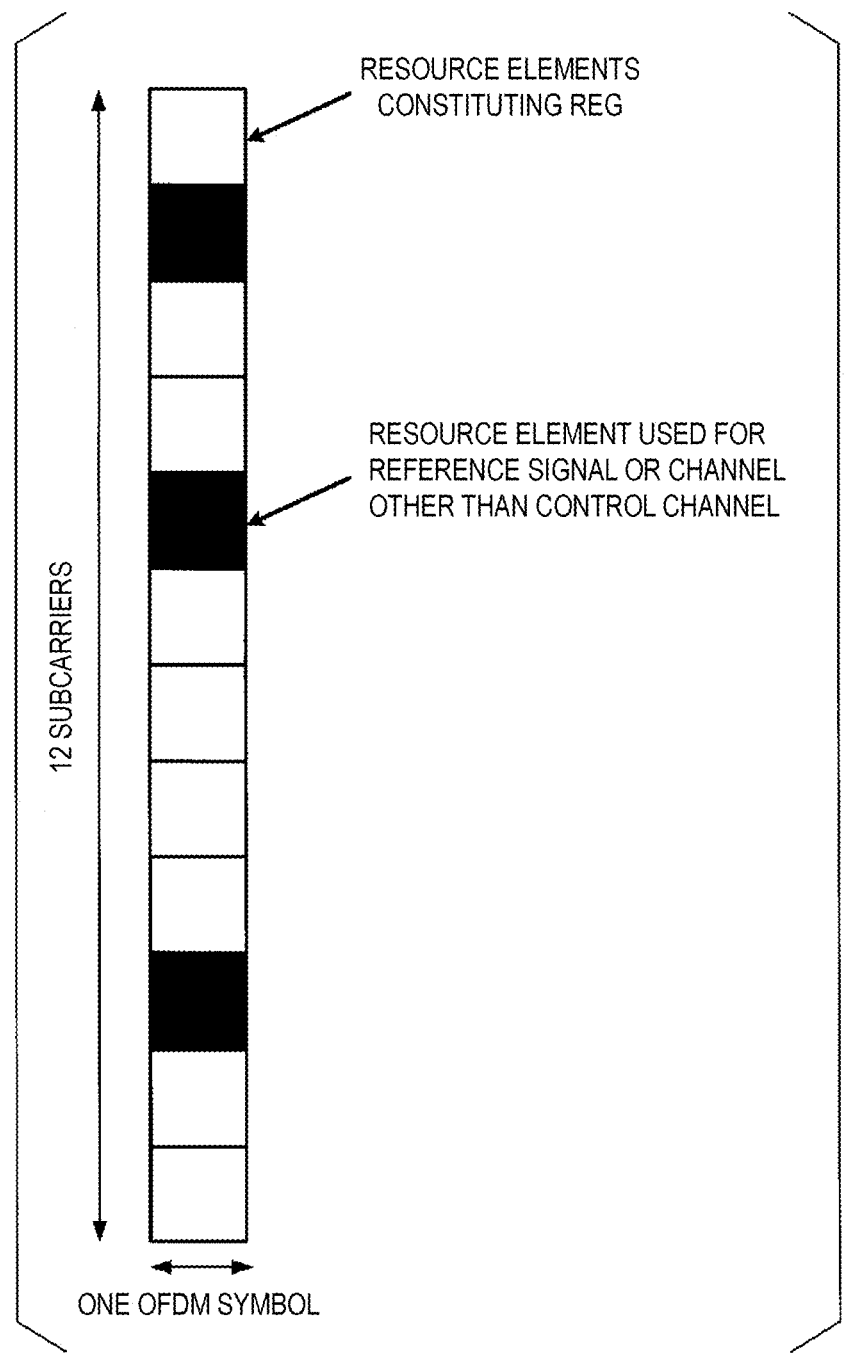
FIG. 6 is a diagram illustrating an example of a configuration of one REG according to the one aspect of the present embodiment.

FIG. 6 is a diagram illustrating an example of a configuration of one REG according to the one aspect of the present embodiment. The REG may include one OFDM symbol in one PRB. That is, the REG may include 12 pieces of continuous REs in the frequency domain. Some of the REs constituting the REG may be a RE to which the downlink control information is not mapped. The REG may be configured to include the RE to which the downlink control information is not mapped or may be configured not to include the RE to which the downlink control information is not mapped. The RE to which the downlink control information is not mapped may be a RE to which the reference signal is mapped, may be a RE to which a channel other than the control channel is mapped, or may be a RE which the terminal apparatus 1 assumes to have no control channel mapped.

Figure 7:
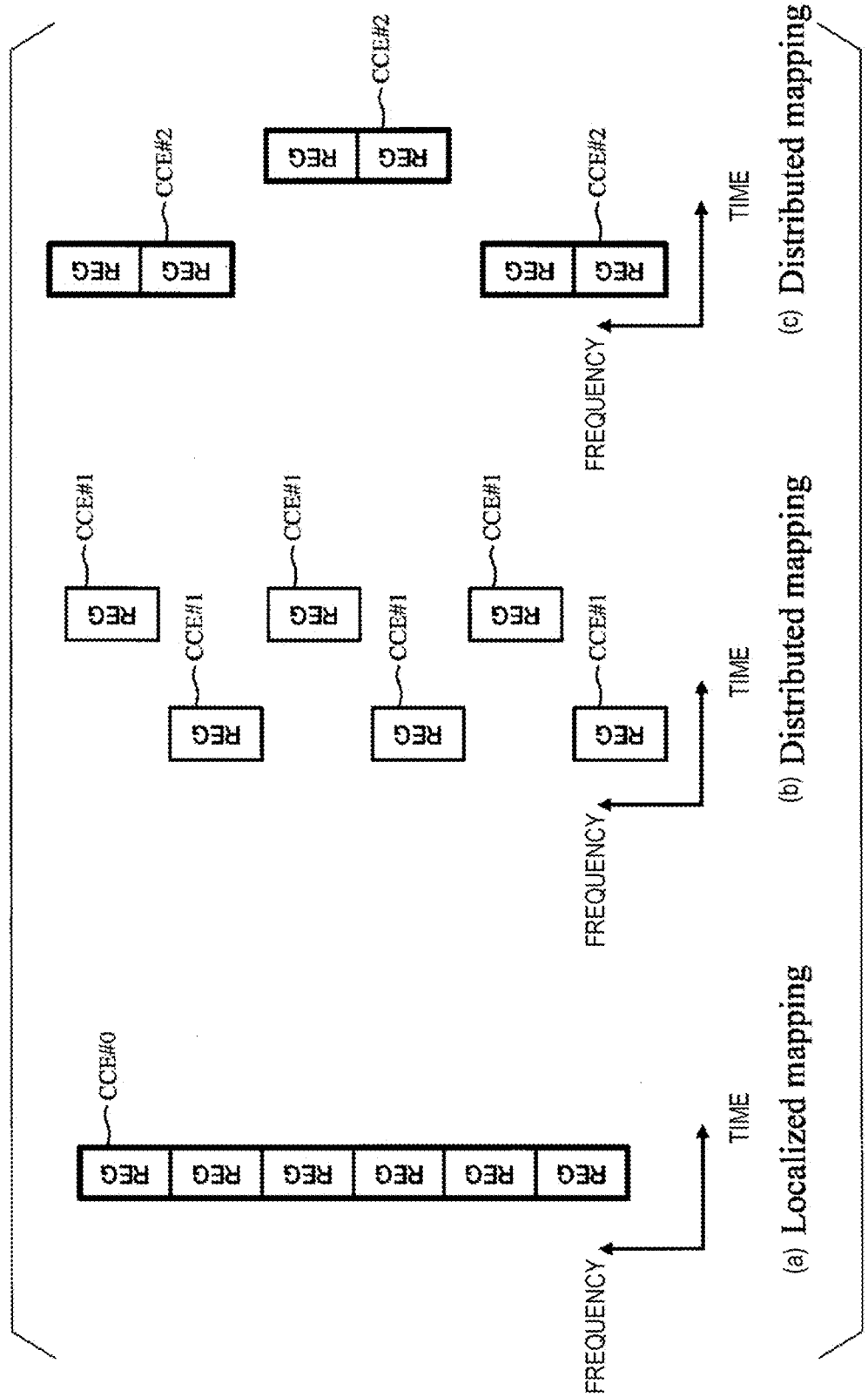
FIG. 7 is a diagram illustrating configuration examples of CCEs according to the one aspect of the present embodiment.

FIG. 7 is a diagram illustrating a configuration example of CCEs according to the one aspect of the present embodiment. The CCE may include six REGs. As illustrated in FIG. 7(a), the CCE may include continuously mapped REGs (Localized mapping). As illustrated in FIG. 7(b), the CCEs may include non-continuously mapped REGs (Distributed mapping). As illustrated in FIG. 7(c), the CCEs may include non-continuously mapped REG groups. In FIG. 7(c), the REG group includes the two REGs.

The CCE may be configured to include one or more REG groups. The REG group is also referred to as an REG bundle. The terminal apparatus 1 may assume that precoders applied to the REs in the REG group are the same. The terminal apparatus 1 can perform channel estimation assuming that the precoder applied to the REs in the REG group is the same. Meanwhile, the terminal apparatus 1 may assume that the precoders applied to the REs are not the same between the REG groups. In other words, the terminal apparatus 1 need not assume that the precoders applied to the REs are the same between the REG groups. The phrase "between the REG groups" may also be interpreted as "between the two different REG groups". The terminal apparatus 1 can perform the channel estimation assuming that the precoders applied to the REs are not the same between the REG groups. The details of the REG group are described later.

Figure 8:
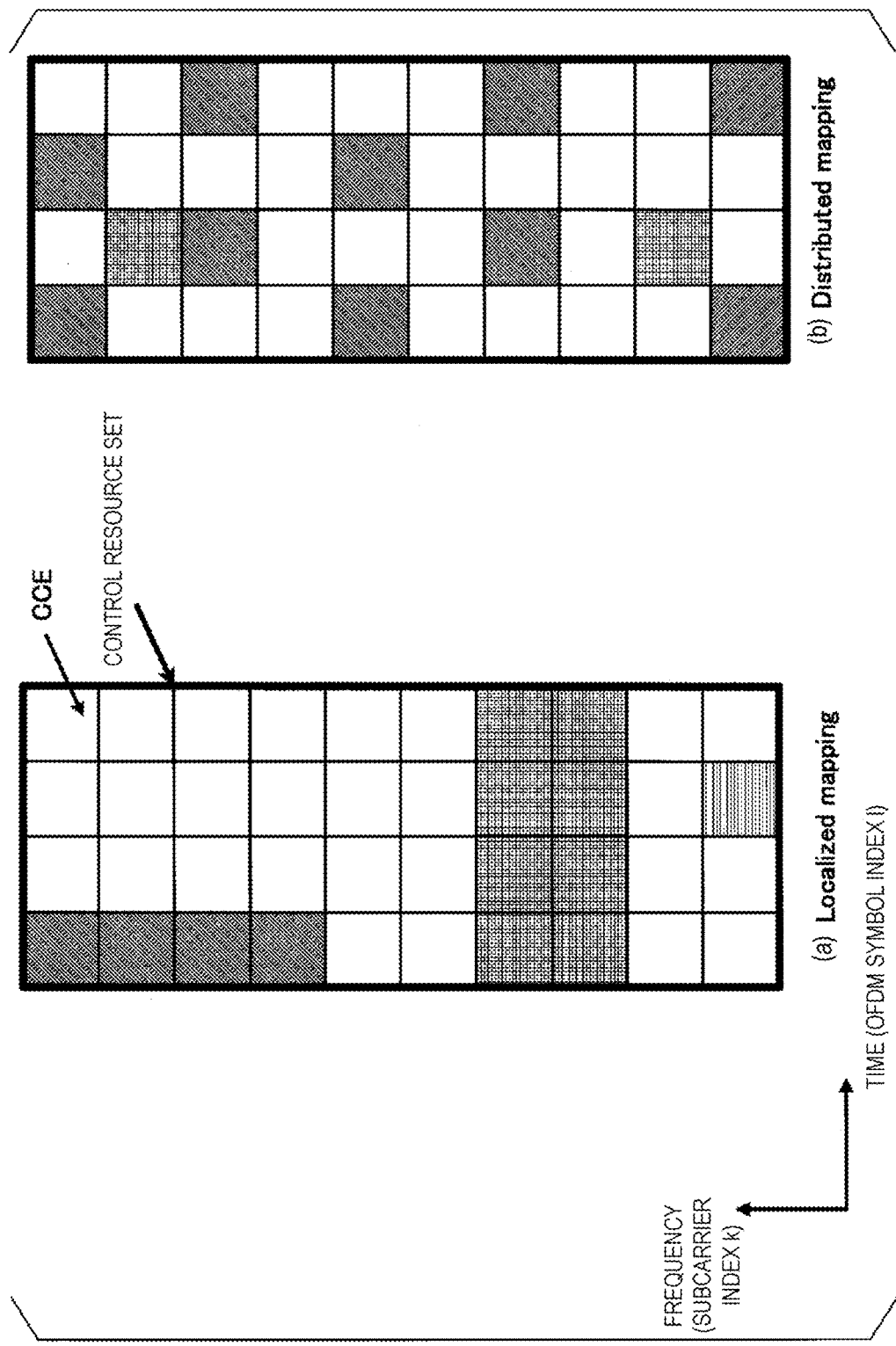
FIG. 8 is a diagram illustrating a configuration example of a PDCCH candidate according to the one aspect of the present embodiment.

FIG. 8 is a diagram illustrating a configuration example of a PDCCH candidate according to the one aspect of the present embodiment. In FIG. 8, the CCE includes the continuously mapped REGs as illustrated in FIG. 7(a). The PDCCH candidate is configured based on the CCEs. FIG. 8 illustrates an example of mapping the PDCCH candidate, assuming the CCEs including the continuously mapped REGs. As illustrated in FIG. 8(a), the PDCCH candidate may include the continuously mapped CCEs (Localized mapping). As illustrated in FIG. 8(a), the PDCCH candidate may include four CCEs indicated by the diagonal lines, may include eight CCEs indicated by the grid lines, or may include one CCE indicated by the horizontal lines. As illustrated in FIG. 8(b), the PDCCH may include the non-continuously mapped CCEs (Distributed mapping). As illustrated in FIG. 8(b), the PDCCH candidate may include 10 CCEs indicated by the diagonal lines, or may include two CCEs indicated by the grid lines.

The number of CCEs constituting the PDCCH candidate is also referred to as an Aggregation Level (AL). A collection of the PDCCH candidates with the aggregation level of $AL_X$ is also referred to as a search space with the aggregation level $AL_X$. In other words, the search space with the aggregation level $AL_X$ may include one or more PDCCH candidates with the aggregation level of $AL_X$. The search space may also include the PDCCH candidates with the plurality of aggregation levels. For example, the CSS may include the PDCCH candidates with the plurality of aggregation levels. The USS may include the PDCCH candidates with the plurality of aggregation levels. A set of the aggregation levels of the PDCCH candidates included in the CSS may differ from a set of the aggregation levels of the PDCCH candidates included in the USS.

Hereinafter, the REG group will be described.

The REG group may be used for channel estimation in the terminal apparatus 1. For example, the terminal apparatus 1 performs the channel estimation for each REG group. This is based on a difficulty in performing the channel estimation (for example, MMSE channel estimation and the like) in the REs for the reference signals to which different precoders are applied. Here, the MMSE is an abbreviation for Minimum Mean Square Error.

The accuracy of channel estimation varies depending on at least a power allocated to the reference signal, a density of an RE in the time frequency domain, the RE being used for the reference signal, an environment of a radio channel, and the like. The accuracy of channel estimation varies depending on at least the time frequency domain used for the channel estimation. In various aspects of the present embodiment, the REG group may be used as a parameter to configure the time frequency domain used for the channel estimation.

That is, a larger REG group means that a higher gain of the channel estimation accuracy can be obtained. Meanwhile, a smaller REG group means that a larger number of REG groups are included in one PDCCH candidate. The larger number of REG groups in one PDCCH candidate is preferable for a transmission method (referred to as precoder rotation, precoder cycling, and the like) that obtains spatial diversity by applying different precoders to the respective REG groups.

One REG group may include the REGs in the time domain and/or the frequency domain.

The REG group in the time domain is preferable for improving the channel estimation accuracy and/or reduction in the reference signals. For example, the number of REGs constituting the REG group in the time domain may be 1, 2, 3, or another value. The number of REGs constituting the REG group in the time domain may be given based on at least the number of OFDM symbols included in the control resource set. Additionally, the number of REGs constituting the REG group in the time domain may be the same as the number of OFDM symbols included in the control resource set.

The REG group in the frequency domain contributes to the improvement of the channel estimation accuracy. For example, the number of REGs constituting the REG group in the frequency domain may be 2, 3, at least a multiple of 2, or at least a multiple of 3. Additionally, the number of REGs constituting the REG group in the frequency domain may be given based on at least the number of PRBs in the control resource set. Additionally, the number of REGs constituting the REG group in the frequency domain may be the same as the number of PRBs included in the control resource set.

Figure 9:
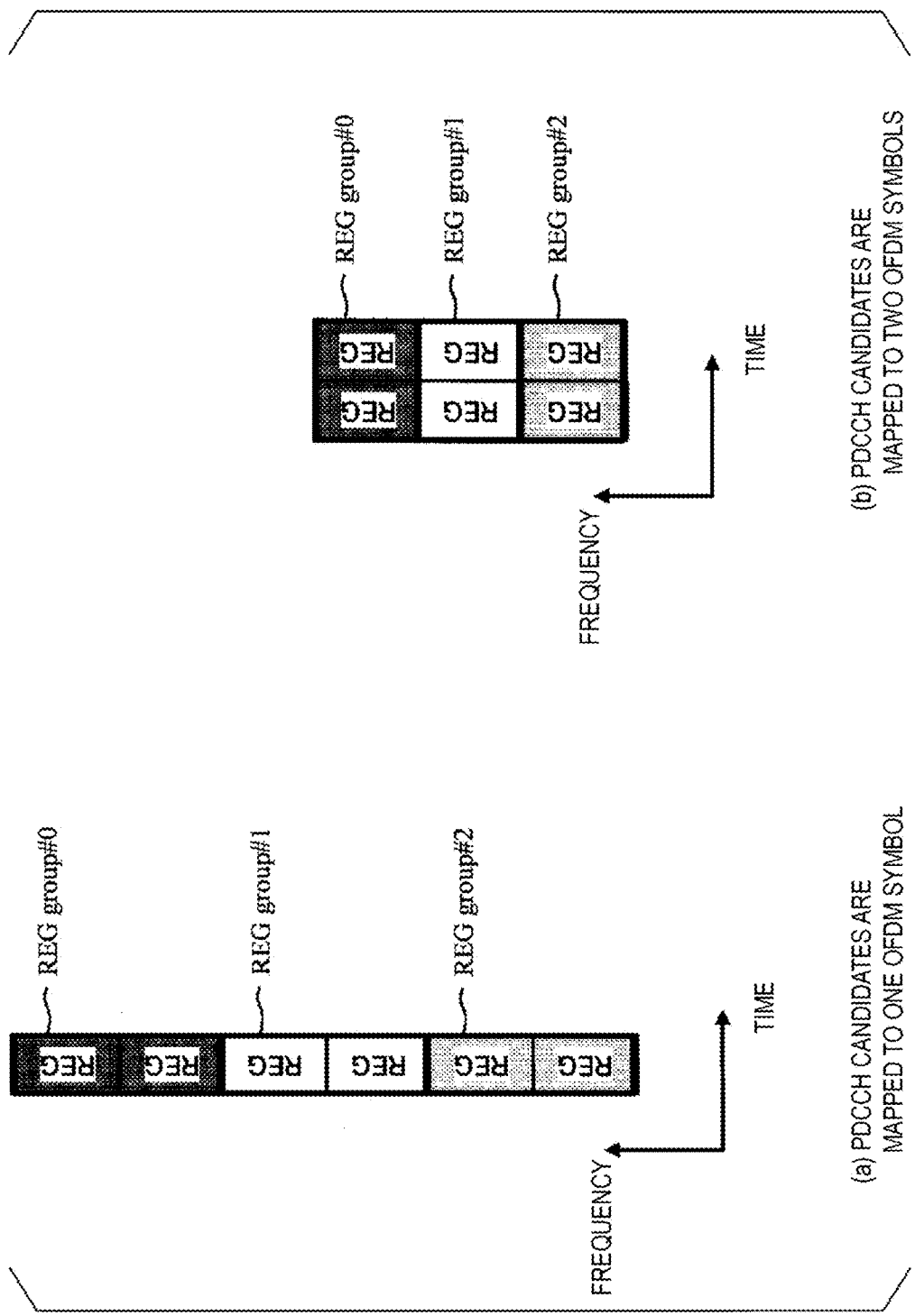
FIG. 9 is a diagram illustrating an example of a relationship between the number of REGs constituting an REG group and a mapping method of the PDCCH candidate according to the one aspect of the present embodiment.

The number of REGs constituting the REG group in the frequency domain may be given based on at least the mapping method of the PDCCH candidate. FIGS. 9A and 9B are diagrams, each illustrating an example of a relationship between the number of REGs constituting an REG group and a mapping method of the PDCCH candidate according to the one aspect of the present embodiment. In one example illustrated in FIG. 9(a), the PDCCH candidates are mapped to one OFDM symbol, and three REG groups including two REGs are configured. In other words, in one example illustrated in FIG. 9(a), one REG group includes the two REGs. The number of REGs constituting the REG group in the frequency domain may include a divisor of the number of PRBs mapped in the frequency direction. In the example illustrated in FIG. 9(a), the number of REGs constituting the REG group in the frequency domain may be 1, 2, 3, or 6.

In one example illustrated in FIG. 9(b), the PDCCH candidates are mapped to two OFDM symbols, and three REG groups including two REGs are configured. In one example illustrated in FIG. 9(b), the number of REGs constituting the REG group in the frequency domain may be either 1 or 3.

The number of REGs constituting the REG group in the frequency domain may be given based on at least the number of OFDM symbols to which the PDCCH candidates are mapped. The number of REGs constituting the REG group in the frequency domain may be configured per the number of OFDM symbols to which the PDCCH candidate is mapped. The number of OFDM symbols to which the PDCCH candidates are mapped may differ based on whether the mapping of REGs constituting the CCE is Time first mapping or Frequency first mapping. That is, the number of REGs constituting the REG group in the frequency domain may be given based on at least the mapping of the REGs constituting the CCE. The number of REGs constituting the REG group in the frequency domain may be configured per the mapping of the REGs constituting the CCE. The mapping of the REGs constituting the CCE may be Time first mapping or Frequency first mapping. The mapping of the REGs constituting the CCE may be either continuous mapping or non-continuous mapping. The number of REGs constituting the REG group in the frequency domain may be given based on at least the number of OFDM symbols to which one CCE is mapped. The number of REGs constituting the REG group in the frequency domain may be configured per the number of OFDM symbols to which one CCE is mapped.

Figure 10:
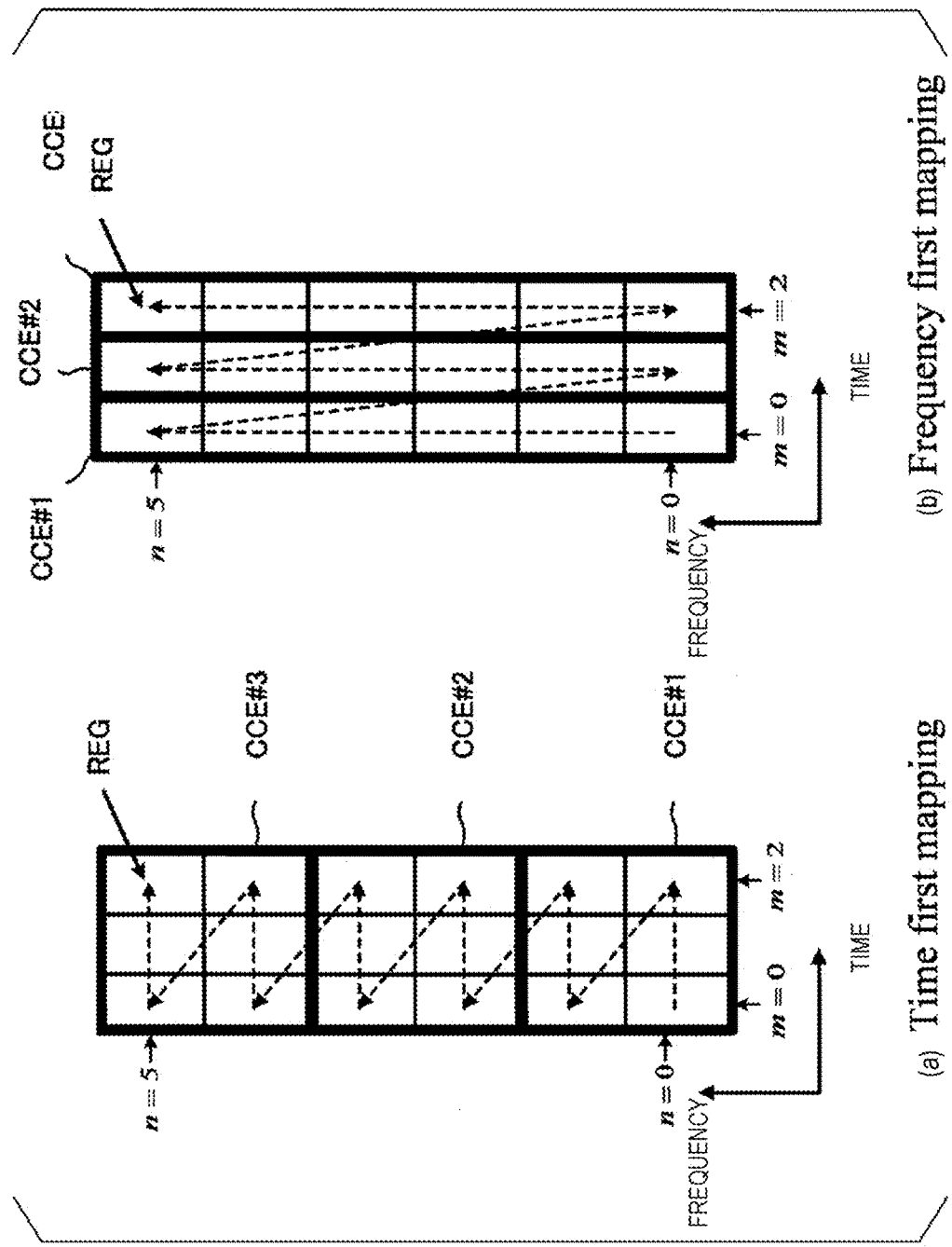
FIG. 10 is a diagram illustrating an example of the mapping of the REGs constituting the CCE according to the one aspect of the present embodiment.

FIGS. 10A and 10B are diagrams, each illustrating an example of the mapping of the REGs constituting the CCE according to the one aspect of the present embodiment. In FIGS. 10A and 10B, the CCE includes the six REGs. In FIGS. 10A and 10B, values of m=0 to 2 are assigned to indices m of the REGs in the time domain from the left. In FIGS. 10A and 10B, values of n=0 to 5 are assigned to indices n of the REGs in the frequency domain from below. FIG. 10(a) illustrates an example in which the REGs constituting the CCE are mapped in a Time first manner. The Time first mapping is a mapping method that maps the REGs from a lower index to a higher index of the REGs in the time domain and increment the index of the REG in the frequency domain by one at a point of time when the index of the REG in the time domain reaches the maximum. FIG. 10(b) illustrates an example in which the REGs constituting the CCE are mapped in a Frequency first manner. The Frequency first mapping is a mapping method that maps the REGs from a lower index to a higher index of the REGs in the frequency domain and increment the index of the REG in the time domain by one at a point of time when the index of the REG in the frequency domain reaches the maximum.

The number of REGs constituting the REG group in the time domain may be given based on at least the number of OFDM symbols to which the PDCCH candidates are mapped. The number of REGs constituting the REG group in the time domain may be configured per the number of OFDM symbols to which the PDCCH candidates are mapped. The number of OFDM symbols to which the PDCCH candidates are mapped may differ based on whether the mapping of REGs constituting the CCE is Time first mapping or Frequency first mapping. That is, the number of REGs constituting the REG group in the time domain may be given based on at least the mapping of the REGs constituting the CCE. The number of REGs constituting the REG group in the time domain may be configured per the mapping of the REGs constituting the CCE. The mapping of the REGs constituting the CCE may be Time first mapping or Frequency first mapping. Alternatively, the mapping of the REGs constituting the CCE may be continuous mapping or non-continuous mapping. The number of REGs constituting the REG group in the time domain may be given based on at least the number of OFDM symbols to which one CCE is mapped. The number of REGs constituting the REG group in the time domain may be configured per the number of OFDM symbols to which one CCE is mapped.

The REG group in the time domain is also preferable for reduction in the reference signals. As illustrated in FIG. 9(b), in a case that the REG group is configured, the reference signal may be included in an anterior OFDM symbol and/or a posterior OFDM symbol. For example, in the time domain, the first REG (head REG) in the REG group may include a RE to which the downlink control information is not mapped, and REGs other than the first REG in the REG group need not include REs to which the downlink control information is not mapped.

A configuration example of the terminal apparatus 1 according to the one aspect of the present embodiment will be described below.

Figure 11:
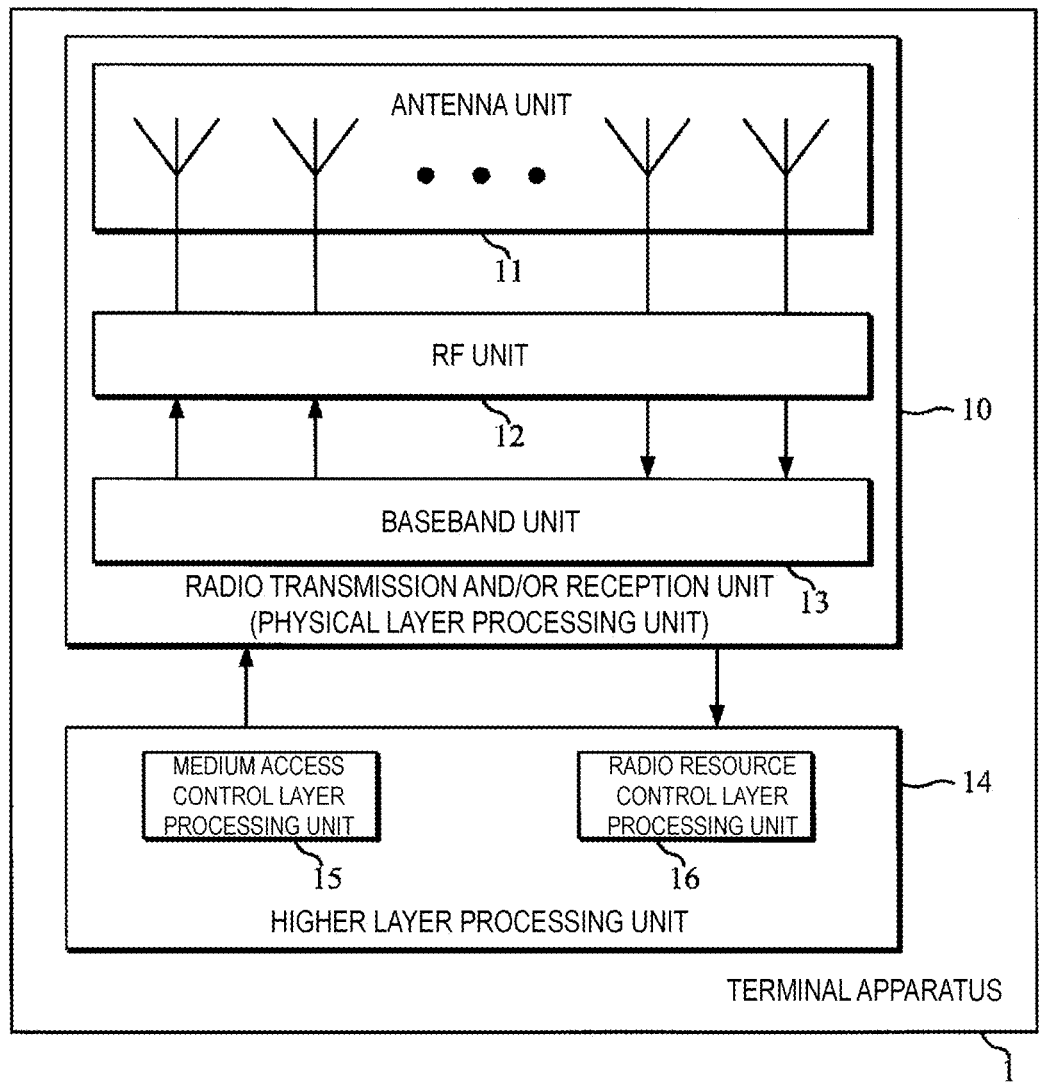
FIG. 11 is a schematic block diagram illustrating a configuration of the terminal apparatus 1 according to the present embodiment.

FIG. 11 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of a MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus. The radio resource control layer processing unit 16 sets various types of configuration information/parameters based on a higher layer signal received from the base station apparatus 3. Namely, the radio resource control unit 16 sets the various configuration information/parameters in accordance with the information indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

A configuration example of the base station apparatus 3 according to one aspect of the present embodiment will be described below.

Figure 12:
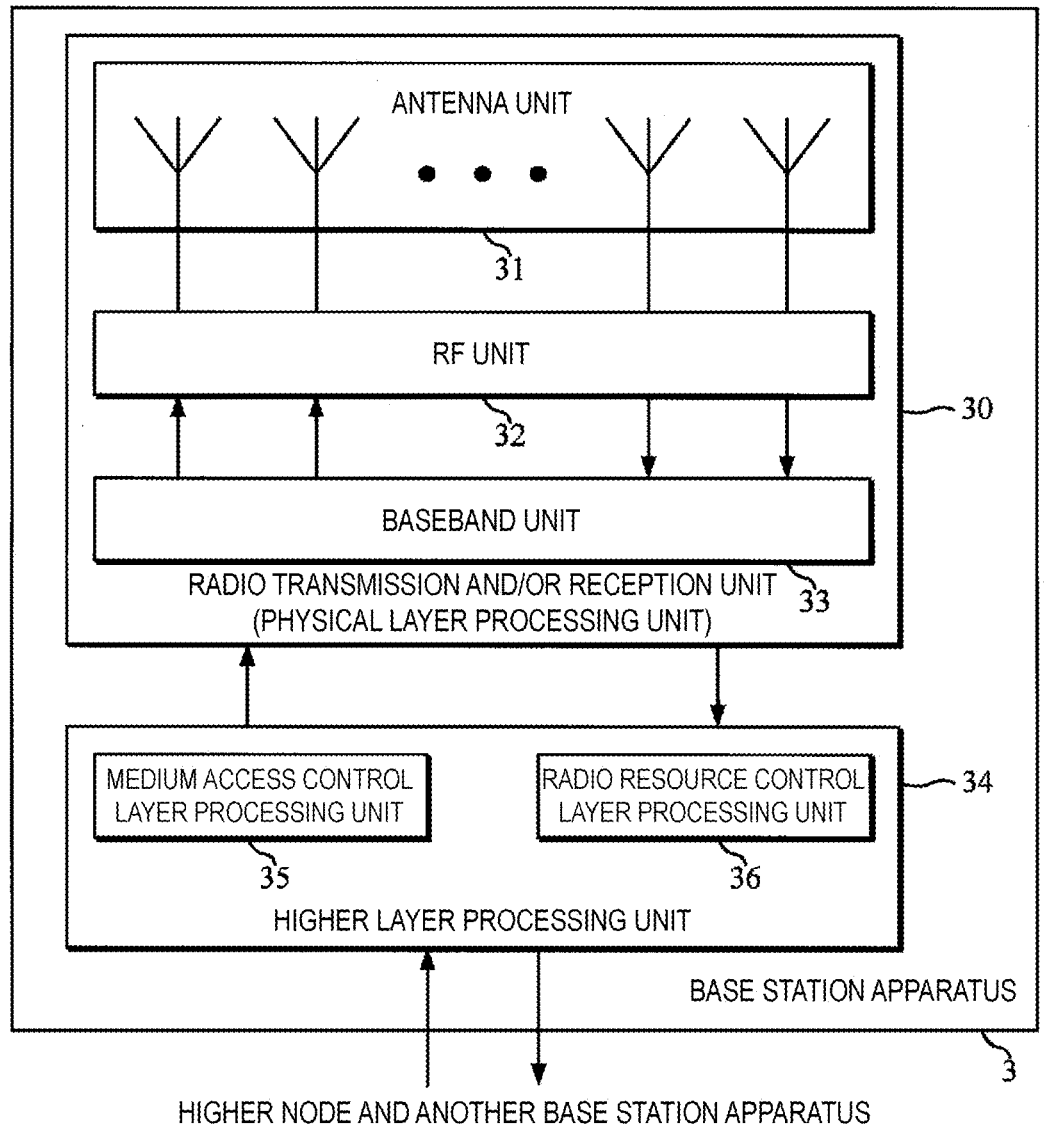
FIG. 12 is a schematic block diagram illustrating a configuration of a base station apparatus 3 according to the present embodiment.

FIG. 12 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on PDSCH, system information, an RRC message, a MAC CE, and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

An example of an initial connection procedure according to the present embodiment will be described below.

The base station apparatus 3 includes a communicable range (or a communication area) controlled by the base station apparatus 3. The communicable range is divided into one or a plurality of cells (or serving cells, sub-cells, beams, and the like), and communications with the terminal apparatus 1 can be managed for each cell. Meanwhile, the terminal apparatus 1 selects at least one cell from the plurality of cells and attempts to establish a connection with the base station apparatus 3. Here, a first state in which the connection between the terminal apparatus 1 and at least one cell of the base station apparatus 3 is established is also referred to as RRC Connection. A second state in which the terminal apparatus 1 has not established the connection with any cell of the base station apparatus 3 is also referred to as RRC idle. In addition, a third state in which the connection of the terminal apparatus 1 with at least one cell of the base station apparatus 3 is established but some functions are limited between the terminal apparatus 1 and the base station apparatus 3 is also referred to as RRC suspended. The RRC suspended is also referred to as RRC inactive.

Figure 13:
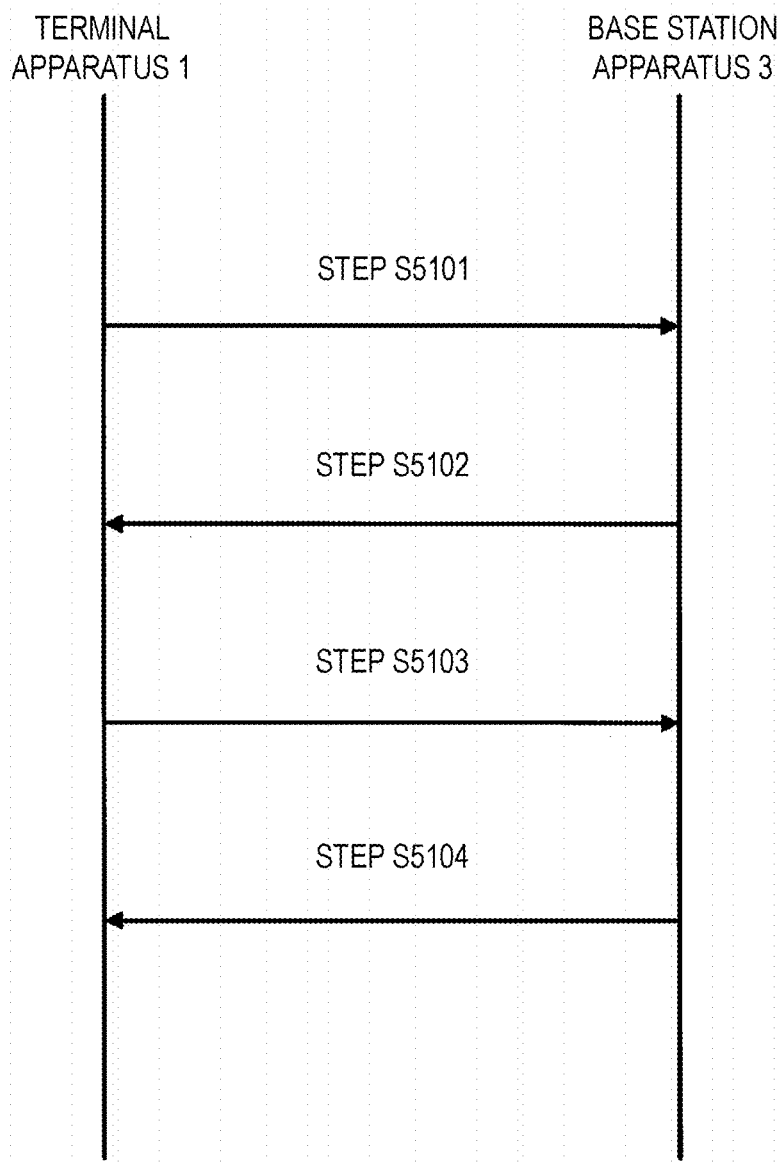
FIG. 13 is a diagram illustrating an example of a first initial connection procedure (4-step contention based RACH procedure) according to the one aspect of the present embodiment.

The terminal apparatus 1 in RRC idle may attempt to establish a connection with at least one cell of the base station apparatus 3. Here, the cell to which the terminal apparatus 1 attempts to connect is also referred to as a target cell. FIG. 13 is a diagram illustrating an example of a first initial connection procedure (4-step contention based RACH procedure) according to the one aspect of the present embodiment. The first initial connection procedure includes at least some of Steps 5101 to 5104.

Step 5101 is a step in which the terminal apparatus 1 requests a response for the initial connection from the target cell via a physical channel. Alternatively, Step 5101 is a step in which the terminal apparatus 1 performs the first transmission to the target cell via the physical channel. Here, the physical channel may be, for example, a PRACH. The physical channel may be a channel dedicatedly used to request the response for the initial connection. The physical channel may be the PRACH. In Step 5101, a message transmitted from the terminal apparatus 1 via the physical channel is also referred to as a random access message 1. The random access message 1 may be a random access preamble configured by the higher layer signaling (higher layer parameter).

The terminal apparatus 1 performs time frequency synchronization in the downlink prior to performing Step 5101. In the first state, a synchronization signal is used for the terminal apparatus 1 to perform the time frequency synchronization in the downlink.

The synchronization signal including an ID of the target cell (cell ID) may be transmitted. The synchronization signal including a sequence generated based on at least the cell ID may be transmitted. The synchronization signal including the cell ID may mean that a sequence of the synchronization signals is given based on the cell ID. A beam (or a precoder) may be applied to the synchronization signal, and the synchronization signal may be transmitted.

The beam exhibits a phenomenon in which an antenna gain differs depending on a direction. The beam may be given based on at least directivity of the antenna. The beam may be given based on at least a phase shift of a carrier signal. The beam may also be given by applying a precoder.

The terminal apparatus 1 receives the PBCH transmitted from the target cell. The PBCH may be transmitted that includes essential information block (Master Information Block (MIB) and Essential Information Block (EIB)) including the essential system information used for the connection of the terminal apparatus 1 with the target cell. The essential information block is system information. The essential information block may include information on the radio frame number. The essential information block may include information on a position in a super frame including a plurality of radio frames (e.g., information for indicating at least some of System Frame Numbers (SFNs) in the super frame). The PBCH may also include an index of the synchronization signal. The PBCH may include information on the reception of a PDCCH. The essential information block may be mapped to a BCH in a transport channel. The essential information block may be mapped to a BCCH in a logical channel.

The information on the reception of the PDCCH may include information for indicating the control resource set. The information for indicating the control resource set may include information on the number of PRBs to which the control resource sets are mapped. The information for indicating the control resource set may include information for indicating the mapping of the control resource set. The information for indicating the control resource set may include information on the number of OFDM symbols to which the control resource sets are mapped. The information for indicating the control resource set may include information for indicating a period (periodicity) of the slots to which the control resource sets are mapped. The terminal apparatus 1 can attempt to receive the PDCCH based on at least the information for indicating the control resource set included in the PBCH.

The information on the reception of the PDCCH may include information on an ID that indicates a destination of the PDCCH. The ID that indicates the destination of the PDCCH may be an ID used for scrambling CRC bits added to the PDCCH. The ID that indicates the destination of the PDCCH is also referred to as Radio Network Temporary Identifier (RNTI). Information on an ID used for scrambling the CRC bits added to the PDCCH may be included. The terminal apparatus 1 can attempt to receive the PDCCH based on at least the information on the ID included in the PBCH.

The RNTI may include System Information-RNTI (SI-RNTI), Paging-RNTI (P-RNTI), Common-RNTI (C-RNTI), Temporary C-RNTI, and Random Access-RNTI (RA-RNTI). The SI-RNTI is used at least for scheduling of the PDSCH that is transmitted with the system information included. The P-RNTI is used at least for scheduling of the PDSCH that is transmitted with information, such as paging information and/or a change notification of the system information, included. The C-RNTI is used at least for scheduling user data to the terminal apparatus 1 in RRC connection. The Temporary C-RNTI is used at least for scheduling a random access message 4. The temporary C-RNTI is used at least for scheduling of the PDSCH including data to be mapped to a CCCH in the logical channel. The RA-RNTI is used at least for scheduling of the random access message 2.

The information on the reception of the PDCCH may include information on the aggregation level of the search space included in the control resource set. The terminal apparatus 1 can identify the aggregation level of the PDCCH candidate which the terminal apparatus 1 should attempt to receive, based on at least the information on the aggregation level of the search space included in the control resource set included in the PBCH, and determine the search space.

The information on the reception of the PDCCH may include information on the mapping method of the REGs constituting the CCE. The information on the mapping method of the REGs constituting the CCE may include information for indicating continuous mapping and non-continuous mapping. The information on the mapping method of the REGs constituting the CCE may include information for indicating whether the mapping method of the REGs constituting the CCE is Time first mapping or Frequency first mapping.

The information on the reception of the PDCCH may include information on the REG group. The information on the reception of the PDCCH may include information for indicating the number of REGs constituting the REG group in the frequency domain. The information on the reception of PDCCH may include information for indicating the number of REGs constituting the REG group in the time domain.

The information on the REG group may include at least some or all of a first configuration, a second configuration, and a third configuration. The first configuration indicates at least some or all of a configuration 1A to a configuration 1H. (Configuration 1A) The number of REGs constituting the REG group in the frequency domain is equal to the number of PRBs constituting the control resource set. (Configuration 1B) The number of REGs constituting the REG group in the time domain is equal to the number of OFDM symbols constituting the control resource set. (Configuration 1C) The terminal apparatus 1 assumes that the precoders applied to the physical resources (CCE, REG, and the like) in the control resource set are the same. Alternatively, the terminal apparatus 1 assumes that the precoders applied to all of the physical resources (CCE, REG, and the like) in the control resource set are the same. (Configuration 1D) The terminal apparatus 1 assumes that the reference signal corresponding to the control resource set has been transmitted regardless of whether the PDCCH is detected in the control resource set. Alternatively, the terminal apparatus 1 assumes that the reference signal corresponding to the control resource set is always transmitted. (Configuration 1E) The reference signal corresponding to the control resource set is used for tracking of the time frequency domain (calibration of the time frequency domain). (Configuration 1F) The REG group in the frequency domain and/or the time domain is configured across at least two or more CCEs. (Configuration 1G) The reference signal included in the control resource set is used for channel measurement in the higher layer. (Configuration 1H) The number of transmission antenna ports of PDCCH included in the control resource set is configured to 1, 2, or 4.

In the configuration 1G, the channel measurement in the higher layer may include, for example, Reference Signal Received Power (RSRP).

In the first configuration, the RS corresponding to the control resource set may be Shared RS. In the first configuration, the RS included in the control resource set may be Shared RS.

The second configuration indicates at least some or all of the configurations 2A to 2C: (Configuration 2A) The number of REGs constituting the REG group in the frequency domain, (Configuration 2B) The number of REGs constituting the REG group in the time domain, (Configuration 2C) The number of transmission antenna ports for the PDCCH included in the control resource set. The third configuration indicates that the number of REGs constituting the REG group in the frequency domain and/or the number of REGs constituting the REG group in the time domain is given based on at least various parameters of the control resource set. The various parameters of the control resource set may be included in the information on the reception of the PDCCH. The various parameters of the control resource set may include the number of PRBs included in the control resource set. The various parameters of the control resource set may include the number of OFDM symbols included in the control resource set. The various parameters of the control resource set may include the mapping method of the REGs constituting the CCE. The various parameters of the control resource set may include the number of transmission antenna ports for the PDCCH included in the control resource set. The various parameters of the control resource set may include the aggregation level of the search space included in the control resource set.

Whether the PDCCH included in a control resource set B is mapped to the RE for a reference signal A corresponding to a control resource set A may be given based on at least whether any of the first configuration, the second configuration, or the third configuration is applied to the control resource set A.

Furthermore, whether the PDCCH is mapped to the RE for the reference signal A may be based on whether the RE for the reference signal A and the RE used for the PDCCH overlap. The PDCCH need not include the reference signal B corresponding to the PDCCH.

Whether the PDSCH scheduled by the PDCCH included in the control resource set B is mapped to the RE for the reference signal corresponding to the control resource set A may be given based on at least whether any of the first configuration, the second configuration, or the third configuration is applied to the control resource set A. Furthermore, whether the PDSCH is mapped to the RE may be based on whether the RE and the RE used for the PDSCH overlap.

Furthermore, whether the PDSCH is mapped to the RE for the reference signal A may be based on whether the RE for the reference signal A and the RE used for the PDSCH overlap. The PDSCH need not include the reference signal B corresponding to the PDSCH.

In a case that the first configuration is applied to the control resource set A, the PDCCH included in the control resource set A need not be mapped to the RE for the reference signal corresponding to the control resource set A. In a case that the first configuration is applied to the control resource set A, the PDCCH included in the control resource set A may be mapped to the RE for the reference signal corresponding to the control resource set B. In a case that the first configuration is applied to the control resource set A, the PDCCH included in the control resource set B need not be mapped to the RE for the reference signal corresponding to the PDCCH and/or the RE for the reference signal corresponding to the control resource set A. The RE for the reference signal corresponding to the control resource set may be the RE to which the PDCCH included in the control resource set is not mapped. The RE for the reference signal corresponding to the PDCCH may be the RE to which the PDCCH is not mapped.

In a case that the first configuration is applied to the control resource set A, the PDSCH scheduled by the PDCCH included in the control resource set A need not be mapped to the RE for the reference signal corresponding to the control resource set A and/or the RE for the reference signal corresponding to the PDSCH. In a case that the first configuration is applied to the control resource set A, the PDSCH scheduled by the PDCCH included in the control resource set A may be mapped to the RE for the reference signal corresponding to the control resource set B. In a case that the first configuration is applied to the control resource set A, the PDSCH scheduled by the PDCCH included in the control resource set B need not be mapped to the RE for the reference signal corresponding to the PDSCH, the RE for the reference signal corresponding to the control resource set A, and/or the RE for the reference signal corresponding to the PDCCH. The RE for the reference signal corresponding to the PDSCH may be the RE to which the PDSCH is not mapped.

In a case that the second configuration is applied to the control resource set A, the PDCCH included in the control resource set A need not be mapped to the RE for the reference signal corresponding to the PDCCH. In a case that the second configuration is applied to the control resource set A, the PDCCH included in the control resource set A may be mapped to the RE for the reference signal corresponding to the control resource set B. In a case that the second configuration is applied to the control resource set A, the PDCCH included in the control resource set B need not be mapped to the RE for the reference signal corresponding to the PDCCH. In a case that the second configuration is applied to the control resource set A, the PDCCH included in the control resource set B may be mapped to the RE for the reference signal corresponding to the control resource set A.

In a case that the second configuration is applied to the control resource set A, the PDSCH scheduled by the PDCCH included in the control resource set A need not be mapped to the RE for the reference signal corresponding to the PDCCH and/or the RE for the reference signal corresponding to the PDSCH. In a case that the second configuration is applied to the control resource set A, the PDSCH scheduled by the PDCCH included in the control resource set A may be mapped to the RE for the reference signal corresponding to the control resource set B. In a case that the second configuration is applied to the control resource set A, the PDSCH scheduled by the PDCCH included in the control resource set B need not be mapped to the RE for the reference signal corresponding to the PDSCH and/or the RE for the reference signal corresponding to the PDSCH. In a case that the second configuration is applied to the control resource set A, the PDSCH scheduled by the PDCCH included in the control resource set B may be mapped to the RE for the reference signal corresponding to the control resource set A.

In a case that the third configuration is applied to the control resource set A, the PDCCH included in the control resource set A need not be mapped to the RE for the reference signal corresponding to the PDCCH. In a case that the third configuration is applied to the control resource set A, the PDCCH included in the control resource set A may be mapped to the RE for the reference signal corresponding to the control resource set B. In a case that the third configuration is applied to the control resource set A, the PDCCH included in the control resource set B need not be mapped to the RE for the reference signal corresponding to the PDCCH. In a case that the third configuration is applied to the control resource set A, the PDCCH included in the control resource set B may be mapped to the RE for the reference signal corresponding to the control resource set A.

In a case that the third configuration is applied to the control resource set A, the PDSCH scheduled by the PDCCH included in the control resource set A need not be mapped to the RE for the reference signal corresponding to the PDCCH and/or the RE for the reference signal corresponding to the PDSCH. In a case that the third configuration is applied to the control resource set A, the PDSCH scheduled by the PDCCH included in the control resource set A may be mapped to the RE for the reference signal corresponding to the control resource set B. In a case that the third configuration is applied to the control resource set A, the PDSCH scheduled by the PDCCH included in the control resource set B need not be mapped to the RE for the reference signal corresponding to the PDCCH and/or the RE for the reference signal corresponding to the PDSCH. In a case that the third configuration is applied to the control resource set A, the PDSCH scheduled by the PDCCH included in the control resource set B may be mapped to the RE for the reference signal corresponding to the control resource set A.

The reference signals corresponding to the control resource set may correspond to a plurality of PDCCH candidates included in the control resource set. The reference signals corresponding to the control resource set may be used for demodulation of the plurality of PDCCHs included in the control resource set.

The base station apparatus 3 can transmit the PBCH including information on the reception of the PDCCH and indicate monitoring of a first control resource set to the terminal apparatus 1. The terminal apparatus 1 monitors the first control resource set based on at least detection of the information on the reception of the PDCCH included in the PBCH. The first control resource set is used at least for scheduling of the first system information. The first system information may include system information important for the terminal apparatus 1 to connect to the target cell. The first system information may include information on various configurations of downlink. The first system information may include information on various configurations of PRACH. The first system information may include information on various configurations of uplink. The first system information may include information of a signal waveform (OFDM or DFT-s-OFDM) configured for random access message 3 transmission. The first system information may include at least a part of the system information other than information included in the MIB. The first system information may be mapped to the BCH in the transport channel. The first system information may be mapped to the BCCH in the logical channel. The first system information may include at least System Information Block type 1 (SIB1). The first system information may include at least System Information Block type 2 (SIB2). The first control resource set may be used for scheduling of the random access message 2. Note that the SIB1 may include information on measurement required to perform the RRC connection. The SIB2 may include information on a common and/or shared channel among the plurality of terminal apparatuses 1 in a cell.

The terminal apparatus 1 may monitor the PDCCH based on at least the information on the reception of the PDCCH. The terminal apparatus 1 may monitor the PDCCH based on at least the information on the REG group. Based on at least the information on the reception of the PDCCH, whether any of the first configuration, the second configuration, or the third configuration is applied for monitoring the PDCCH may be given. The terminal apparatus 1 may assume the configuration applied for monitoring the PDCCH based on at least the information on the reception of the PDCCH.

For example, based on at least whether the frequency band of the control resource set is given based on the frequency band of the synchronization signal and/or the PBCH, whether any of the first configuration, the second configuration, or the third configuration is applied for monitoring the PDCCH may be given. For example, in a case that the frequency band of the control resource set is given based on at least the frequency band of the synchronization signal and/or the PBCH, the first configuration may be applied for monitoring the PDCCH. Furthermore, in a case that as the frequency band of the control resource set is the same as the frequency band of the synchronization signal and/or the PBCH, the first configuration may be applied for monitoring the PDCCH. The third configuration may be applied in a case that the frequency band of the control resource set is not based on the frequency band of the synchronization signal and/or the PBCH.

For example, based on at least whether the frequency band of the control resource set overlaps with a part or all of the frequency band of the synchronization signal and/or the PBCH, whether any of the first configuration, the second configuration, or the third configuration is applied for monitoring of the PDCCH may be given. For example, in a case that the frequency band of the control resource set overlaps with a part or all of the frequency band of the synchronization signal and/or the PBCH, the first configuration may be applied for monitoring the PDCCH. Furthermore, in a case that the frequency band of the control resource set differs from the frequency band of the synchronization signal and/or the PBCH, the third configuration may be applied.

For example, based on at least the RNTI used for monitoring the PDCCH in the control resource set, whether any of the first configuration, the second configuration, or the third configuration is applied for monitoring the PDCCH may be given. For example, in a case that at least the SI-RNTI is used for monitoring the PDCCH in the control resource set, the first configuration may be applied. In a case that at least the P-RNTI is used for monitoring the PDCCH in the control resource set, the first configuration may be applied.

For example, based on at least the mapping method of the REGs constituting the CCE included in the control resource set, whether any of the first configuration, the second configuration, or the third configuration is applied for monitoring the PDCCH may be given. For example, in a case that the mapping method of the REGs constituting the CCE included in the control resource set is non-continuous mapping (distributed mapping), the first configuration may be applied for monitoring the PDCCH. In addition, in a case that the mapping method of the REGs constituting the CCE included in the control resource set is continuous mapping (localized mapping), the third configuration may be applied for monitoring the PDCCH. For example, in a case that the mapping method of the REGs constituting the CCE included in the control resource set is Frequency first mapping, the first configuration may be applied for monitoring the PDCCH. In addition, in a case that the mapping method of the REGs constituting the CCE included in the control resource set is Time first mapping, the third configuration may be applied for monitoring the PDCCH.

For example, the mapping method of the REGs constituting the CCE included in the control resource set may be given based on at least the number of OFDM symbols included in the control resource set. For example, in a case that the number of OFDM symbols included in the control resource set is one, the mapping method of the REGs constituting the CCE included in the control resource set may be Frequency first mapping. In addition, in a case that the number of OFDM symbols is larger than 1, the mapping method of the REGs constituting the CCE included in the control resource set may be Time first mapping.

The base station apparatus 3 can transmit the MIB and/or the first system information and indicate the monitoring of the second control resource set to the terminal apparatus 1. The first system information may include the information on the reception of the PDCCH. The terminal apparatus 1 monitors the second control resource set based on at least the MIB and/or the information on the reception of the PDCCH included in the first system information. The second control resource set may be used for scheduling of the PDSCH including the paging information and/or the information for the change notification of system information. The second control resource set and the first control resource set may be the same.

The base station apparatus 3 can transmit the MIB and/or the first system information and indicate the monitoring of the third control resource set to the terminal apparatus 1. The terminal apparatus 1 monitors the third control resource set based on at least the MIB and/or the information on the reception of the PDCCH included in the first system information. The third control resource set may be used to schedule the PDSCH including the second system information. The second system information may be the system information not included in the MIB and the first system information. The second system information may be transmitted based on at least a request from the terminal apparatus 1. The request from the terminal apparatus 1 may be performed based on at least the transmission of the random access message 1, the random access message 3, and/or the PUCCH. The third control resource set may be the same as the first control resource set and/or the second control resource set.

Step 5102 is a step in which the base station apparatus 3 performs a response to the random access message 1 from the terminal apparatus 1. The response is also referred to as the random access message 2. The random access message 2 may be transmitted via the PDSCH. The PDSCH including the random access message 2 is scheduled by the PDCCH. The CRC bits included in the PDCCH may be scrambled with RA-RNTI. The random access message 2 including a special uplink grant may be transmitted. The special uplink grant is also referred to as a random access response grant. The special uplink grant may be included in the PDSCH including the random access message 2. The random access response grant may include at least Temporary C-RNTI.

The base station apparatus 3 can transmit the MIB, the first system information, and/or the second system information, and indicate monitoring of a fourth control resource set to the terminal apparatus 1. The second system information may include the information on the reception of the PDCCH. The terminal apparatus 1 monitors the fourth control resource set based on at least the MIB, and the information on the reception of the PDCCH included in the first system information and/or the second system information. The number of CRC bits added to the PDCCH may be scrambled with Temporary C-RNTI. The fourth control resource set may be used for scheduling of the random access message 2. The fourth control resource set may be the same as the first control resource set, the second control resource set, and/or the third control resource set.

The fourth control resource set may be further given based on at least the physical root index u included in the random access message 1 transmitted from the terminal apparatus 1 and/or a resource (PRACH resource) used for transmission of the random access message 1. Here, the random access message 1 may correspond to the monitoring of the fourth control resource set. The resource may indicate a resource of a time and/or a frequency. The resource may be given by an index of a resource block and/or an index of a slot (subframe). The monitoring of time and the fourth control resource set may be triggered by the random access message 1.

Step 5103 is a step in which the terminal apparatus 1 transmits a request for RRC connection to the target cell. The request for RRC connection is also referred to as the random access message 3. The random access message 3 may be transmitted via the PUSCH scheduled by the random access response grant. The random access message 3 may include an ID used to identify the terminal apparatus 1. The ID may be an ID managed by the higher layer. The ID may be SAE Temporary Mobile Subscriber Identity (S-TMSI). The ID may be mapped to the CCCH in the logical channel.

Step 5104 is a step in which the base station apparatus 3 transmits Contention resolution message to the terminal apparatus 1. The contention resolution message is also referred to as the random access message 4. After the transmission of the random access message 3, the terminal apparatus 1 monitors the PDCCH for scheduling of the PDSCH including the random access message 4. The random access message 4 may include a contention avoidance ID. Here, the contention avoidance ID is used to solve a contention in which a plurality of terminal apparatuses 1 transmit signals by using the same radio resource. The contention avoidance ID is also referred to as UE contention resolution identity.

In Step 5104, the terminal apparatus 1 that has transmitted the random access message 3 including the ID (S-TMSI, for example) used to identify the terminal apparatus 1 monitors the random access message 4 including the contention resolution message. In a case that the contention avoidance ID included in the random access message 4 is the same as the ID used to identify the terminal apparatus 1, the terminal apparatus 1 may consider that the contention resolution has been successfully completed and set a value of the Temporary C-RNTI in a C-RNTI field. The terminal apparatus 1 for which the value of the Temporary C-RNTI has been set in the C-RNTI field is considered to have completed the RRC connection.

The control resource set to monitor the PDCCH for scheduling of the random access message 4 may be the same as the fourth control resource set. The base station apparatus 3 can transmit the information on the reception of PDCCH included in the random access message 2 and indicate the monitoring of a fifth control resource set to the terminal apparatus 1. The terminal apparatus 1 monitors the PDCCH based on at least the information on the reception of the PDCCH included in the random access message 2. The fifth control resource set may be used for scheduling of a random access message 5.

The terminal apparatus 1 in RRC connection can receive dedicated RRC signaling mapped to the DCCH in the logical channel. The base station apparatus 3 can transmit the dedicated RRC signaling including the information on the reception of the PDCCH and indicate the monitoring of a sixth control resource set to the terminal apparatus 1. The terminal apparatus 1 may monitor the PDCCH based on at least the information on the reception of the PDCCH included in the dedicated RRC signaling. The second configuration or the third configuration may be applied to a sixth control resource set. A physical resource of the sixth control resource set may be given based on at least the C-RNTI.

The base station apparatus 3 can transmit the random access message 4 including the information on the reception of the PDCCH reception, and indicate the monitoring of the sixth control resource set to the terminal apparatus 1. In a case that the random access message 4 includes the information on the reception of the PDCCH, the terminal apparatus 1 may monitor the sixth control resource set based on at least the information on the reception of the PDCCH. In a case that the random access message 4 does not include the information on the reception of the PDCCH, the terminal apparatus 1 may monitor the USS included in at least any of the first to the fifth control resource sets. The physical resource for the USS may be given based on at least the C-RNTI. The first to the fifth control resource sets may be common control resource sets. The sixth control resource set may be a dedicated control resource set.

The information on the reception of the PDCCH may include information common to a plurality of control resource sets and information configured for each of the plurality of control resource sets. For example, the information on the REG group applied to the first to the fourth control resource sets may be defined. Here, the information on the reception of the PDCCH related to the first control resource set may include the information on the REG group, and the information on the reception of the PDCCH related to the second to fourth control resource sets need not include the information on the REG group. The information on the reception of the PDCCH related to the first control resource set may be applied to the second to fourth control resource sets. Here, the information on the REG group may be defined per each of the fifth and sixth control resource sets. Here, the information for indicating the control resource set may be defined per the first to sixth control resource sets.

Various aspects of devices according to one aspect of the present embodiment will be described below.

(1) To accomplish the object described above, aspects of the present invention are contrived to provide the following measures. That is, a first aspect of the present invention is a terminal apparatus including: a receiver configured to monitor a PDCCH in a control resource set; and a decoding unit configured to decode the PDCCH. The PDCCH includes one or more REG groups. One of the one or more REG groups includes a plurality of REGs. The plurality of REGs in the one REG group are multiplied by the same precoder and transmitted. In a first control resource set, the number of the REGs constituting the one REG group is given based on at least a PBCH. Whether a first configuration is applied to the first control resource set is given based on information on a reception of the PDCCH. The first configuration indicates that the number of the REGs constituting the one REG group is given based on at least the number of PRBs included in the first control resource set. In a second control resource set, the number of the REGs constituting the one REG group is given based on at least dedicated RRC signaling.

(2) In the first aspect of the present invention, whether the PDCCH included in the second control resource set is mapped to a reference signal corresponding to the first control resource set is given based on at least whether the first configuration is applied to the one REG group.

(3) Additionally, a second aspect of the present invention is a base station apparatus including: a coding unit configured to encode a PDCCH; and a transmitter configured to transmit the PDCCH in a control resource set. The PDCCH includes one or more REG groups. One of the one or more REG groups includes a plurality of REGs. The plurality of REGs in the one REG group are multiplied by the same precoder and transmitted. In a first control resource set, the number of the REGs constituting the one REG group is given based on at least a PBCH. Whether a first configuration is applied to the first control resource set is given based on information on a reception of the PDCCH. The first configuration indicates that the number of the REGs constituting the one REG group is given based on at least the number of PRBs included in the first control resource set. In a second control resource set, the number of the REGs constituting the one REG group is given based on at least dedicated RRC signaling.

(4) In the second aspect of the present invention, whether the PDCCH included in the second control resource set is mapped to a reference signal corresponding to the first control resource set is given based on at least whether the first configuration is applied to the one REG group.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB. Furthermore, the base station apparatus 3 according to the above-described embodiment may serve as NR Radio Access Network, NextGen Radio Access Network (NG-RAN). Furthermore, the base station apparatus 3 according to the above-described embodiment may have some or all functions of a higher node than an gNB (NR NodeB, 5G NodeB). The base station apparatus 3 according to the above-described embodiment may be 5G Core Network (5GC). The base station apparatus 3 according to the above-described embodiment may be NR Core Network, NextGen Core Network (NGC).

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit

The invention claimed is:
1. A terminal device comprising:
reception circuitry configured to or programmed to monitor a Physical Downlink Control Channel (PDCCH) in a control resource set and receive a Physical Downlink Shared Channel (PDSCH) scheduled by a Downlink Control Information (DCI) format transmitted by the PDCCH, wherein:
the PDCCH includes one or more Control Channel Elements (CCEs),
each of the one or more CCEs includes 6 Resource Element Groups (REGs) and each of the REGs includes 1 Physical Resource Block (PRB) of 1 Orthogonal Frequency Domain Multiplexing (OFDM) symbol,
each of the one or more CCEs includes one or more REG bundles distributed in a frequency domain, each of the one or more REG bundles includes one or more of REGs,
a number of the REGs in each REG bundle in the frequency domain is provided according to a number of OFDM symbols in each of the one or more CCEs,
in a case that a first configuration is configured by REG bundle related information, the PDSCH is not mapped to Resource Elements (REs) for a Demodulation Reference Signal (DMRS) corresponding to the control resource set, and
in a case that a second configuration is configured by the REG bundle related information, the PDSCH is not mapped to REs for a DMRS in the PDCCH.
2. The terminal device according to claim 1, wherein a number of the REGs in the each REG bundle in a time domain is equal to a number of OFDM symbols in the control resource set.
3. The terminal device according to claim 1, wherein:
in a case that the first configuration is configured by the REG bundle related information, a precoder is same within control resource set, and
in a case that the second configuration is configured by the REG bundle related information, the precoder is same within the each REG bundle.
4. A base station device comprising:
transmission circuitry configured to or programmed to transmit a Physical Downlink Control Channel (PDCCH) in a control resource set and transmit a Physical Downlink Shared Channel (PDSCH) scheduled by a Downlink Control Information (DCI) format transmitted by the PDCCH, wherein:
the PDCCH includes one or more Control Channel Elements (CCEs),
each of one or more CCEs includes 6 Resource Element Groups (REGs) and each of the REGs includes 1 Physical Resource Block (PRB) of 1 Orthogonal Frequency Domain Multiplexing (OFDM) symbol,
each of the one or more CCEs includes one or more REG bundles distributed in a frequency domain, each of the one or more REG bundles includes one or more of REGs,
a number of the REGs in the each REG bundle in the frequency domain is provided according to a number of OFDM symbols in each of the one or more CCEs,
in a case that a first configuration is configured by REG bundle related information, the PDSCH is not mapped to Resource Elements (REs) for a Demodulation Reference Signal (DMRS) corresponding to the control resource set, and in a case that a second configuration is configured by the REG bundle related information, the PDSCH is not mapped to REs for a DMRS in the PDCCH.

5. The base station device according to claim 4, wherein a number of the REGs in the each REG bundle in a time domain is equal to a number of OFDM symbols in the control resource set.

6. The base station device according to claim 4, wherein:
in a case that the first configuration is configured by the REG bundle related information, a precoder is same within control resource set, and
in a case that the second configuration is configured by the REG bundle related information, the precoder is same within the each REG bundle.

7. A communication method used for a terminal device, the communication method comprising:
monitoring a Physical Downlink Control Channel (PDCCH) in a control resource set and receiving a Physical Downlink Shared Channel (PDSCH) scheduled by a Downlink Control Information (DCI) format transmitted by the PDCCH, wherein:
the PDCCH includes one or more Control Channel Elements (CCEs),
each of the one or more CCEs includes 6 Resource Element Groups (REGs) and each of the REGs includes 1 Physical Resource Block (PRB) of 1 Orthogonal Frequency Domain Multiplexing (OFDM) symbol,
each of the one or more CCEs includes one or more REG bundles distributed in a frequency domain, each of the one or more REG bundles includes one or more of REGs,
a number of the REGs in each REG bundle in the frequency domain is provided according to a number of OFDM symbols in each of the one or more CCEs,
in a case that a first configuration is configured by REG bundle related information, the PDSCH is not mapped to Resource Elements (REs) for a Demodulation Reference Signal (DMRS) corresponding to the control resource set, and
in a case that a second configuration is configured by the REG bundle related information, the PDSCH is not mapped to REs for a DMRS in the PDCCH.

8. A communication method used for a base station device, the communication method comprising:
transmitting a Physical Downlink Control Channel (PDCCH) in a control resource set and transmitting a Physical Downlink Shared Channel (PDSCH) scheduled by a Downlink Control Information (DCI) format transmitted by the PDCCH, wherein:
the PDCCH includes one or more Control Channel Elements (CCEs),
each of the one or more CCEs includes 6 Resource Element Groups (REGs) and each of the REGs includes 1 Physical Resource Block (PRB) of 1 Orthogonal Frequency Domain Multiplexing (OFDM) symbol,
each of the one or more CCEs includes one or more REG bundles distributed in a frequency domain, each of the one or more REG bundles includes one or more of REGs,
a number of the REGs in each REG bundle in the frequency domain is provided according to a number of OFDM symbols in each of the one or more CCEs,
in a case that a first configuration is configured by REG bundle related information, the PDSCH is not mapped to Resource Elements (REs) for a Demodulation Reference Signal (DMRS) corresponding to the control resource set, and
in a case that a second configuration is configured by the REG bundle related information, the PDSCH is not mapped to REs for a DMRS in the PDCCH.

* * * * *